(12) United States Patent
Fitzpatrick et al.

(10) Patent No.: US 9,676,310 B2
(45) Date of Patent: Jun. 13, 2017

(54) VEHICLE SEAT WITH THERMAL DEVICE

(71) Applicant: FAURECIA AUTOMOTIVE SEATING, LLC, Troy, MI (US)

(72) Inventors: Robert C. Fitzpatrick, Holland, MI (US); Dana R. Lowell, Holland, MI (US); Tarek Makansi, Tucson, AZ (US); John Latimer Franklin, Tucson, AZ (US)

(73) Assignee: Faurecia Automotive Seating, LLC, Troy, MI (US)

( * ) Notice: Subject to any disclaimer, the term of this patent is extended or adjusted under 35 U.S.C. 154(b) by 0 days.

(21) Appl. No.: 14/430,596

(22) PCT Filed: Sep. 19, 2013

(86) PCT No.: PCT/US2013/060549
§ 371 (c)(1),
(2) Date: Mar. 24, 2015

(87) PCT Pub. No.: WO2014/052145
PCT Pub. Date: Apr. 3, 2014

(65) Prior Publication Data
US 2015/0266405 A1    Sep. 24, 2015

Related U.S. Application Data

(60) Provisional application No. 61/705,480, filed on Sep. 25, 2012.

(51) Int. Cl.
*A47C 7/74*    (2006.01)
*B60N 2/56*    (2006.01)

(52) U.S. Cl.
CPC ............. *B60N 2/5685* (2013.01); *B60N 2/56* (2013.01); *B60N 2/5692* (2013.01)

(58) Field of Classification Search
CPC ....... B60N 2/5685; B60N 2/5692; B60N 2/56
(Continued)

(56) References Cited

U.S. PATENT DOCUMENTS

| 2,376,902 A | 5/1945 | Clark |
| RE22,763 E | 6/1946 | Clark |

(Continued)

FOREIGN PATENT DOCUMENTS

| CA | 2911134 | 5/2016 |
| CN | 201636597 U | 11/2010 |

(Continued)

OTHER PUBLICATIONS

International (PCT) Search Report and Written Opinion completed on Jun. 17, 2016 for International (PCT) App. No. PCT/US2016/019743, 19 pages.

(Continued)

*Primary Examiner* — Rodney B White
(74) *Attorney, Agent, or Firm* — Barnes & Thornburg LLP

(57) ABSTRACT

A vehicle seat includes seat pads included in seat bottoms and seat backs. The seat pads are configured to provide both a cold sensation and a warming sensation to an occupant sitting on the seat pads. According to the present disclosure, a vehicle seat includes an occupant-support base. The occupant-support base includes a cushion cover defining a cushion-receiving space and a cushion positioned to lie in the cushion-receiving space.

19 Claims, 12 Drawing Sheets

(58) Field of Classification Search
USPC .............................. 297/180.1, 180.12, 180.15
See application file for complete search history.

(56) References Cited

U.S. PATENT DOCUMENTS

| | | | |
|---|---|---|---|
| 2,606,996 A | 8/1952 | Westerberg et al. | |
| 2,796,532 A | 6/1957 | Teague et al. | |
| 2,858,350 A | 10/1958 | Fritts et al. | |
| 3,083,381 A | 4/1963 | Bailey | |
| 3,129,345 A | 4/1964 | Hatsopoulos et al. | |
| 3,136,577 A | 6/1964 | Richard | |
| 3,173,032 A | 3/1965 | Maynard | |
| 3,196,524 A | 7/1965 | Jamison | |
| 3,217,189 A | 11/1965 | Bloss | |
| 3,225,549 A | 12/1965 | Elfving | |
| 3,406,753 A | 10/1968 | Habdas | |
| 3,549,201 A | 12/1970 | Wolfe | |
| 3,627,988 A | 12/1971 | Romaniec | |
| 3,754,703 A | 8/1973 | Saponara | |
| 4,343,993 A | 8/1982 | Binnig et al. | |
| 4,423,308 A | 12/1983 | Callaway et al. | |
| 4,523,594 A | 6/1985 | Kuznetz | |
| 4,590,359 A | 5/1986 | Mobius | |
| 4,625,394 A | 12/1986 | Kemnitz et al. | |
| 4,820,903 A | 4/1989 | Ishida | |
| 4,825,488 A | 5/1989 | Bedford | |
| 4,825,868 A | 5/1989 | Susa et al. | |
| 4,930,317 A | 6/1990 | Klein | |
| 4,937,435 A | 6/1990 | Goss et al. | |
| 4,969,684 A | 11/1990 | Zarotti | |
| 5,028,835 A | 7/1991 | Fitzpatrick | |
| 5,138,851 A | 8/1992 | Mardikian | |
| 5,541,464 A | 7/1996 | Johnson et al. | |
| 5,594,534 A | 1/1997 | Genovese | |
| 5,653,741 A | 8/1997 | Grant | |
| 5,712,448 A | 1/1998 | Vandersande et al. | |
| 5,837,002 A | 11/1998 | Augustine et al. | |
| 5,851,338 A | 12/1998 | Pushaw | |
| 5,892,656 A | 4/1999 | Bass | |
| 5,917,229 A | 6/1999 | Nathan et al. | |
| 6,064,037 A * | 5/2000 | Weiss | A47C 7/74 297/180.12 X |
| 6,064,137 A | 5/2000 | Cox | |
| 6,129,990 A | 10/2000 | Frater | |
| 6,220,659 B1 | 4/2001 | McDowell et al. | |
| 6,230,501 B1 * | 5/2001 | Bailey, Sr. | A43B 1/0054 62/51.1 |
| 6,323,413 B1 | 11/2001 | Roth et al. | |
| 6,323,777 B1 | 11/2001 | Durston et al. | |
| 6,328,594 B1 | 12/2001 | Mullen, Jr. | |
| 6,385,976 B1 | 5/2002 | Yamamura et al. | |
| 6,410,971 B1 | 6/2002 | Otey | |
| 6,494,048 B1 | 12/2002 | Ghoshal et al. | |
| 6,501,055 B2 | 12/2002 | Rock et al. | |
| 6,523,354 B1 | 2/2003 | Tolbert | |
| 6,582,456 B1 | 6/2003 | Hand et al. | |
| 6,639,242 B1 | 10/2003 | Chen et al. | |
| 6,651,760 B2 | 11/2003 | Cox et al. | |
| 6,653,607 B2 | 11/2003 | Ellis et al. | |
| 6,720,704 B1 | 4/2004 | Tavkhelidze et al. | |
| 6,774,003 B2 | 8/2004 | Tavkhelidze et al. | |
| 6,823,678 B1 | 11/2004 | Li | |
| 6,863,981 B2 | 3/2005 | McBain | |
| 6,876,123 B2 | 4/2005 | Martinovsky et al. | |
| 6,884,732 B2 | 4/2005 | Najafi et al. | |
| 6,946,596 B2 | 9/2005 | Kucherov et al. | |
| 7,005,381 B1 | 2/2006 | Cox | |
| 7,117,687 B2 | 10/2006 | Naaman | |
| 7,131,187 B2 * | 11/2006 | Check | B29C 65/02 297/180.12 X |
| 7,140,102 B2 | 11/2006 | Taliashvili et al. | |
| 7,253,549 B2 | 8/2007 | Tavkhelidze et al. | |
| 7,305,839 B2 | 12/2007 | Weaver, Jr. et al. | |
| 7,456,543 B2 | 11/2008 | Makansi | |
| 7,708,338 B2 * | 5/2010 | Wolas | A47C 7/72 297/180.1 |
| 7,996,936 B2 | 8/2011 | Marquette et al. | |
| 8,018,117 B2 | 9/2011 | Makansi | |
| 8,066,324 B2 * | 11/2011 | Nathan | B60N 2/5685 297/180.1 |
| 8,101,847 B2 | 1/2012 | Okamura | |
| 8,102,096 B2 | 1/2012 | Makansi | |
| 8,222,511 B2 | 7/2012 | Lofy | |
| 8,316,650 B2 | 11/2012 | Yang | |
| 8,327,477 B2 | 12/2012 | Lachenbruch et al. | |
| 8,495,974 B2 | 7/2013 | Agosta | |
| 8,882,142 B2 * | 11/2014 | Lamesch | B60N 2/002 297/180.12 X |
| 8,969,703 B2 | 3/2015 | Makansi et al. | |
| 8,979,191 B2 | 3/2015 | Friderich | |
| 9,022,464 B2 | 5/2015 | Feng | |
| 9,066,601 B1 | 6/2015 | Aminy et al. | |
| 9,105,808 B2 | 8/2015 | Petrovski | |
| 9,105,809 B2 | 8/2015 | Lofy | |
| 9,335,073 B2 | 5/2016 | Lofy | |
| 2001/0011601 A1 | 8/2001 | Renaud | |
| 2001/0046749 A1 | 11/2001 | Tavkhelidze et al. | |
| 2002/0046762 A1 | 4/2002 | Rossi | |
| 2002/0058975 A1 | 5/2002 | Bieberich | |
| 2002/0170172 A1 | 11/2002 | Tavkhelidze et al. | |
| 2003/0042819 A1 | 3/2003 | Martinovsky et al. | |
| 2003/0084935 A1 | 5/2003 | Bell | |
| 2003/0131419 A1 | 7/2003 | VanSteenburg | |
| 2003/0141455 A1 | 7/2003 | Lambert et al. | |
| 2003/0154725 A1 | 8/2003 | McGrew | |
| 2003/0184188 A1 | 10/2003 | Kucherov et al. | |
| 2003/0230913 A1 | 12/2003 | Buss et al. | |
| 2004/0009729 A1 | 1/2004 | Hill et al. | |
| 2004/0050415 A1 | 3/2004 | Kucherov et al. | |
| 2004/0100131 A1 * | 5/2004 | Howick | B60N 2/5678 297/180.12 |
| 2004/0160092 A1 * | 8/2004 | Laib | A47C 7/74 297/180.1 |
| 2004/0195934 A1 | 10/2004 | Tanielian | |
| 2004/0238516 A1 | 12/2004 | Bulgajewski | |
| 2005/0050415 A1 | 3/2005 | Anand et al. | |
| 2005/0066505 A1 | 3/2005 | Iqbal et al. | |
| 2005/0077618 A1 | 4/2005 | McCutcheon et al. | |
| 2005/0140189 A1 * | 6/2005 | Bajic | B60N 2/5635 297/180.1 |
| 2005/0184565 A1 * | 8/2005 | Weiss | B60N 2/5635 297/180.15 |
| 2005/0184603 A1 | 8/2005 | Martsinovsky | |
| 2005/0189871 A1 | 9/2005 | Tavkhelidze et al. | |
| 2005/0253425 A1 * | 11/2005 | Asada | B60N 2/448 297/180.1 |
| 2006/0000226 A1 | 1/2006 | Weaver et al. | |
| 2006/0027552 A1 * | 2/2006 | Krobok | H05B 3/34 297/180.12 X |
| 2006/0038290 A1 | 2/2006 | Tavkhelidze et al. | |
| 2006/0068176 A1 | 3/2006 | Zafiroglu et al. | |
| 2006/0138896 A1 | 6/2006 | Makansi | |
| 2006/0162761 A1 | 7/2006 | Tanielian | |
| 2006/0180829 A1 | 8/2006 | Martsinovsky | |
| 2006/0191886 A1 | 8/2006 | Pak | |
| 2006/0192196 A1 | 8/2006 | Tavkhelidze et al. | |
| 2006/0207643 A1 | 9/2006 | Weaver, Jr. et al. | |
| 2007/0001507 A1 | 1/2007 | Brennan | |
| 2007/0023077 A1 | 2/2007 | Tanielian | |
| 2007/0033782 A1 | 2/2007 | Taliashvili et al. | |
| 2007/0056623 A1 | 3/2007 | Tavkhelidze et al. | |
| 2007/0069357 A1 | 3/2007 | Weaver et al. | |
| 2007/0084220 A1 * | 4/2007 | Asada | F25B 21/04 297/180.1 X |
| 2007/0112390 A1 | 5/2007 | Lau et al. | |
| 2007/0137687 A1 | 6/2007 | Tanielian | |
| 2007/0181913 A1 | 8/2007 | Li | |
| 2007/0272673 A1 | 11/2007 | Keane | |
| 2007/0277313 A1 * | 12/2007 | Terech | A47C 7/74 297/180.1 X |
| 2007/0289620 A1 | 12/2007 | Stark | |
| 2007/0295973 A1 | 12/2007 | Jinbo et al. | |
| 2008/0017237 A1 | 1/2008 | Bray et al. | |
| 2008/0029146 A1 | 2/2008 | Plissonnier et al. | |

(56) References Cited

U.S. PATENT DOCUMENTS

| | | |
|---|---|---|
| 2008/0042163 A1 | 2/2008 | Weaver, Jr. et al. |
| 2008/0054490 A1 | 3/2008 | McLellan et al. |
| 2008/0155981 A1 | 7/2008 | Tanielian |
| 2008/0173022 A1 | 7/2008 | Petrovski |
| 2008/0237827 A1 | 10/2008 | Autry |
| 2009/0001778 A1 | 1/2009 | Nathan |
| 2009/0025774 A1 | 1/2009 | Plissonnier et al. |
| 2009/0038317 A1 | 2/2009 | Otey |
| 2009/0078690 A1 | 3/2009 | Lee et al. |
| 2009/0121524 A1* | 5/2009 | Abe .............. A47C 7/748 297/180.1 |
| 2009/0199571 A1 | 8/2009 | Creech et al. |
| 2009/0200983 A1 | 8/2009 | Dyer et al. |
| 2009/0205695 A1 | 8/2009 | Makansi |
| 2009/0229648 A1 | 9/2009 | Makansi |
| 2009/0257774 A1 | 10/2009 | Rummler et al. |
| 2009/0283124 A1 | 11/2009 | Seo |
| 2009/0322221 A1 | 12/2009 | Makansi |
| 2010/0031448 A1 | 2/2010 | Hijlkema |
| 2010/0101620 A1 | 4/2010 | Tanaka |
| 2010/0107657 A1 | 5/2010 | Vistakula |
| 2010/0269517 A1 | 10/2010 | Ikeda et al. |
| 2010/0270996 A1 | 10/2010 | Ramadas et al. |
| 2010/0288370 A1* | 11/2010 | Volden .............. A41D 31/02 137/13 |
| 2010/0327636 A1* | 12/2010 | Stoll .............. B60H 1/00285 297/180.1 |
| 2011/0016886 A1 | 1/2011 | Ghoshal et al. |
| 2011/0109128 A1 | 5/2011 | Axakov |
| 2011/0139203 A1 | 6/2011 | Yap |
| 2011/0226299 A1 | 9/2011 | Makansi |
| 2012/0019074 A1 | 1/2012 | Frolov et al. |
| 2012/0032478 A1* | 2/2012 | Friderich .............. B60N 2/448 297/180.1 |
| 2012/0060882 A1 | 3/2012 | Makansi |
| 2012/0060885 A1 | 3/2012 | Makansi et al. |
| 2012/0079837 A1 | 4/2012 | Maranville |
| 2012/0110734 A1 | 5/2012 | An |
| 2012/0113594 A1 | 5/2012 | Goettert et al. |
| 2012/0131748 A1 | 5/2012 | Brykalski et al. |
| 2012/0146455 A1 | 6/2012 | Makansi |
| 2012/0148328 A1 | 6/2012 | Jollet |
| 2012/0198616 A1 | 8/2012 | Makansi et al. |
| 2013/0008181 A1 | 1/2013 | Makansi et al. |
| 2013/0014796 A1 | 1/2013 | Tajima |
| 2013/0097777 A1* | 4/2013 | Marquette .............. A47C 7/74 297/180.12 X |
| 2013/0106147 A1* | 5/2013 | Lazanja .............. B60N 2/5685 297/180.12 |
| 2013/0119717 A1 | 5/2013 | Gong |
| 2013/0180563 A1 | 7/2013 | Makansi |
| 2013/0214583 A1 | 8/2013 | Uramichi |
| 2014/0041396 A1 | 2/2014 | Makansi et al. |
| 2014/0082846 A1 | 3/2014 | Blazar |
| 2015/0121901 A1 | 5/2015 | Makansi et al. |
| 2015/0219368 A1 | 8/2015 | Makansi et al. |
| 2016/0021705 A1 | 1/2016 | Barfuss |
| 2016/0052362 A1 | 2/2016 | Thomas |
| 2016/0133817 A1 | 5/2016 | Makansi |
| 2016/0332549 A1 | 11/2016 | Marquette |

FOREIGN PATENT DOCUMENTS

| | | |
|---|---|---|
| DE | 4010909 A1 | 10/1991 |
| DE | 202011004140 | 6/2012 |
| EP | 1612492 A1 | 1/2006 |
| GB | 2065465 A | 7/1981 |
| JP | S6147907 A | 3/1986 |
| JP | H02116613 U | 9/1990 |
| JP | 2003042590 A | 2/2003 |
| JP | 2003209297 A | 7/2003 |
| JP | 2007175476 A | 7/2007 |
| JP | 2008538850 A | 11/2008 |
| JP | 2009074746 A | 4/2009 |
| JP | 2013198730 | 10/2013 |
| JP | 2013198730 A | 10/2013 |
| WO | WO-9811397 A1 | 3/1998 |
| WO | WO-9913562 A1 | 3/1999 |
| WO | WO-2007078048 A1 | 7/2007 |
| WO | WO-2008027928 A2 | 3/2008 |
| WO | WO-2009102706 A2 | 8/2009 |
| WO | WO-2010078521 A1 | 7/2010 |
| WO | 2010108254 | 9/2010 |
| WO | WO-2010108254 A1 | 9/2010 |
| WO | WO-2010150162 A1 | 12/2010 |
| WO | 2012037031 A1 | 3/2012 |
| WO | 2014052145 | 4/2014 |
| WO | WO-2014052145 A1 | 4/2014 |
| WO | WO-2015066518 A1 | 5/2015 |

OTHER PUBLICATIONS

Aimi, et al. Thermotunneling Based on Cooling Systems for High Efficiency Buildings. General Electric Global Research Center, DOE Report Identifier DE-FC26-04NT42324, 2007.

Austrailian Examination Report dated Aug. 19, 2013 for Application No. 2011/002303.

Chinese Office Action (with translation) dated Apr. 3, 2015 for Application No. 201180043196.7.

Chinese Office Action (with translation) dated Jun. 16, 2015 for Application No. 201280033604.5.

Choi, et al. Selective Epitaxial Growth of SiGe on a SOI Substrate by Using Ultra-High Vacuum Chemical Vapor Deposition. Journal of the Korean Physical Society, vol. 48, No. 4, Apr. 2006, pp. 648-652.

Dimatteo, et al. Micron-gap ThermoPhotoVoltaics (MTPV). Thermophotovoltaic Generation of Electricity Sixth Conference, American Institute of Physics, 2004.

Enikov, et al. Analysis of Nanonmeter Vacuum Gap Formation in Thermo-tunneling Devices. Nanotechnology, vol. 19, No. 7, Published Jan. 31, 2008.

European Communication dated May 27, 2011 for Application No. 07 756 398.9-2208.

European Communication dated Jun. 1, 2011 for Application No. 07 814 511.7-2208.

European Office Action dated Apr. 1, 2015 for Application No. 13828204.1.

European search report and opinion dated May 19, 2016 for Application No. 13828204.1.

European Search Report and Written Opinion dated Apr. 2, 2015 for Application No. 12807127.1.

European Search Report and Written Opinion dated Oct. 12, 2010 for EP Application No. 07556398.9.

European Supplementary Search Report dated Oct. 22, 2010 for Application No. 077814511.7-2208/2057659, PCT/US2007/077042.

Extended European Search Report and Written Opinion dated Nov. 18, 2014 for Application No. 11825739.3.

Ghoshal, et al. Efficient Switched Thermoelectric Refrigerators for Cold Storage Applications. Journal of Electronic Materials. Jul. 2009, vol. 38, Issue 7, pp. 1148-1153.

Hishinuma, et al. Measurements of Cooling by Room Temperature Thermionic Emission Across a Nanometer Gap. J. Appl. Phys. 94, 4690 (2003).

Hishinuma, et al. Vacuum Thermionic Refrigeration with a Semiconductor Heterojunction Structure. Appl. Phys. Lett. 81, 4242 (2002).

Hishinuna, et al. Efficiency of Regrigeration using Thermotunneling and Thermionic Emission in a Vacuum: Use of Nanometer Scale Design. Applied Physics Letters, vol. 78, No. 17, Apr. 23, 2001. (Also published/previously cited as Refrigeration by combined tunneling and thermionic emission in vacuum: Use of nanometer scale design).

Humphrey, et al. Quantum, Cyclic, and Particle-Exchange Heat Engines. Physica E: Low-Dimensional Systems and Nanostructures. vol. 29, Issues 1-2, Oct. 2005, pp. 390-398.

(56) References Cited

OTHER PUBLICATIONS

Indonesian Office Action (no translation) dated Jun. 30, 2015 for Application No. WO0201301075.
International Preliminary Report on Patentability dated Jan. 16, 2014 for PCT Application No. US2012/045443.
International Preliminary Report on Patentability dated Feb. 10, 2015 for PCT Application No. US2013/050378.
International Preliminary Report on Patentability dated Mar. 12, 2009 for PCT Application No. US2007/007042.
International Preliminary Report on Patentability dated Jul. 14, 2011 for PCT Application No. US2009/069959.
International Preliminary Report on Patentability dated Jul. 17, 2014 for PCT Application No. US2012/071838.
International Search Report and the Written Opinion dated Mar. 8, 2013 for PCT Application No. US2012/071838.
International search report and written opinion dated Jan. 21, 2016 for PCT/US2015/059598.
International Search Report and Written Opinion dated Jan. 22, 2007 for PCT Application No. US2007/060871.
International Search Report and Written Opinion dated Feb. 11, 2015 for PCT Application No. US2014/063511.
International Search Report and Written Opinion dated Mar. 15, 2010 for PCT Application No. US2009/069959.
International Search Report and Written Opinion dated Apr. 15, 2009 for PCT Application No. US2007/060871.
International Search Report and Written Opinion dated Apr. 17, 2009 for PCT Application No. US2009/033660.
International search report and written opinion dated Apr. 22, 2016 for PCT/US2016/017603.
International search report and written opinion dated Jun. 17, 2016 for PCT/US2016/019743.
International Search Report and Written Opinion dated Sep. 5, 2008 for PCT Application No. US2007/077042.
International Search Report and Written Opinion dated Oct. 1, 2012 for PCT Application No. US2012/045443.
International Search Report and Written Opinion dated Dec. 30, 2013 for PCT Application No. US2013/050378.
Jangidze, et al. Electroplating of Conformal Electrodes for Vacuum Nanogap Tunnel Junction. Tbilisi State University, Chavchavadze Ave. 13, 0179, Georgia, Nov. 2008, pp. 1-11.
Korotkov, et al. Possible Cooling by Resonant Fowler-Nordheim Emission. Appl. Phys. Lett. 75, 2491 (1999).
Labounty, et al. Design and Characterization of Thin Film Microcoolers. J. Appl. Phys. 89, 4059 (2001).
Lachenbruch, C. Skin Cooling Surfaces: Estimating the Importance of Limiting Skin Temperature.Ostomy Wound Management. Feb. 2005.
Lauterbach. Smart Clothes Self-Powered by Body Heat. Avantex Symposium, 2002.
Mahan, et al. Multilayer Thermionic Refrigerator. J. Appl. Phys. 83, 4683 (1998).
Mahan, G.D. Thermionic Refrigeration. J. Appl. Phys. 76, 4362 (1994).
McCarthy, et al. Enhancing Thermoelectric Energy Recovery via Modulations of Source Temperature for Cyclical Heat Loadings. Journal of Heat Transfer, Jun. 2007, vol. 129, pp. 749-755 (7 pgs).
Menke, et al. Bismuth Telluride (Bi2Te3)Nanowires: Synthesis by Cyclic Electrodeposition/Stripping, Thinning by Electrooxidation, and Electrical Power Generation. Langmuir, 2006, 22(25), pp. 10564-10574.

Mexican Office Action dated Mar. 27, 2014 Application No. MX/a/2031/009378.
Mexican Office Action dated Jun. 13, 2013 for Application No. MX/a/2013/002569.
Noro, et al. The Thermoelectric Properties and Crystallography of Bi—Sb—Te—Se Thin Films Grown by Ion Beam Sputtering. J. Appl. Phys. 73, 1252 (1993).
Notice of allowance dated Jun. 29, 2011 for U.S. Appl. No. 12/302,782.
Notice of allowance dated Jul. 24, 2014 for U.S. Appl. No. 13/101,015.
Notice of allowance dated Sep. 7, 2012 for U.S. Appl. No. 12/367,965.
Notice of allowance dated Sep. 15, 2008 for U.S. Appl. No. 11/344,622.
Notice of allowance dated Nov. 21, 2011 for U.S. Appl. No. 12/376,254.
Office Action dated Feb. 1, 2016 for U.S. Appl. No. 13/541,530.
Office Action dated Feb. 17, 2015 for U.S. Appl. No. 13/541,530.
Office action dated Mar. 15, 2012 for U.S. Appl. No. 12/367,965.
Office Action dated Mar. 18, 2014 for U.S. Appl. No. 13/394,288.
Office action dated Mar. 21, 2014 for U.S. Appl. No. 13/101,015.
Office Action dated Mar. 23, 2015 for U.S. Appl. No. 13/394,288.
Office Action dated Mar. 24, 2015 for U.S. Appl. No. 13/728,794.
Office Action dated Apr. 7, 2011 for U.S. Appl. No. 12/302,782.
Office action dated May 21, 2012 for U.S. Appl. No. 13/330,345.
Office action dated Jun. 3, 2016 for U.S. Appl. No. 13/940,093.
Office Action dated Jun. 12, 2014 for U.S. Appl. No. 13/394,288.
Office Action dated Jun. 29, 2011 for U.S. Appl. No. 12/376,254.
Office Action dated Jun. 29, 2016 for U.S. Appl. No. 13/394,288.
Office Action dated Jul. 30, 2015 for U.S. Appl. No. 13/541,530.
Office action dated Jul. 31, 2015 for U.S. Appl. No. 13/940,093.
Office Action dated Aug. 18, 2014 for U.S. Appl. No. 13/394,288.
Office Action dated Oct. 16, 2014 for U.S. Appl. No. 13/394,288.
Office action dated Nov. 4, 2013 for U.S. Appl. No. 13/101,015.
Office Action dated Nov. 13, 2015 for U.S. Appl. No. 13/394,288.
Office Action dated Nov. 14, 2013 for U.S. Appl. No. 13/394,288.
PCT International Search Report and the Written Opinion dated Dec. 23, 2011 for PCT Application No. US2011/051227.
Philippines Examination Report dated Apr. 8, 2015 for Application No. 1/2013/500025.
Philippines Office Action dated Nov. 6, 2014 for Application No. 1/2013/500025.
Snyder, et al. Complex Thermoelectric Materials. Nature Materials, vol. Feb. 7, 2008.
Yin, et al. Strain relaxation of SiGe Islands on Compliant Oxide. Journal of Applied Physics, vol. 91, No. 12, Jun. 15, 2002.
Yonenaga, et al. Thermal and electrical properties of Czochralski grown GeSi single crystals. Journal of Physics and Chemistry of Solids, vol. 62, Issue 7, Jul. 2001, pp. 1313-1317.
Zhdanov, et al. Substrate-Mediated Photo Induced Chemical Reactions on Ultrathin Metal Films. Department of Applied. Physics, Apr. 19, 1999, Surface Science 432 (1999) L599-L603.
PCT Search Report and Written Opinion completed on Jan. 29, 2014 and issued in connection with PCT/US2013/060549.
Office Action for Chinese Patent Application No. 201380053428.6, dated Jun. 30, 2016 including English language summary, 13 pages.
Chinese Office Action for Chinese App. No. 201380053428.6 received on Dec. 5, 2016, 10 pages.
French Search Report for French App. No. 14/57708 received on Mar. 27, 2015, 2 pages.

\* cited by examiner

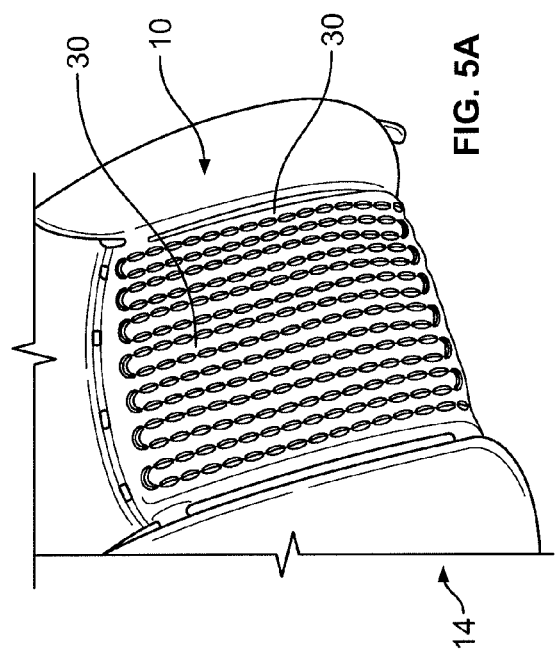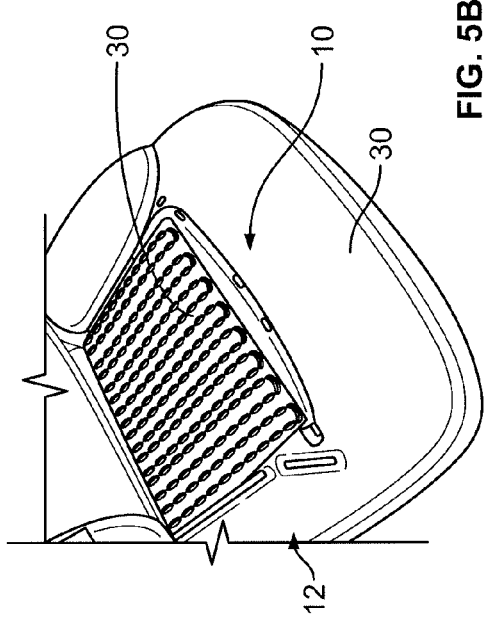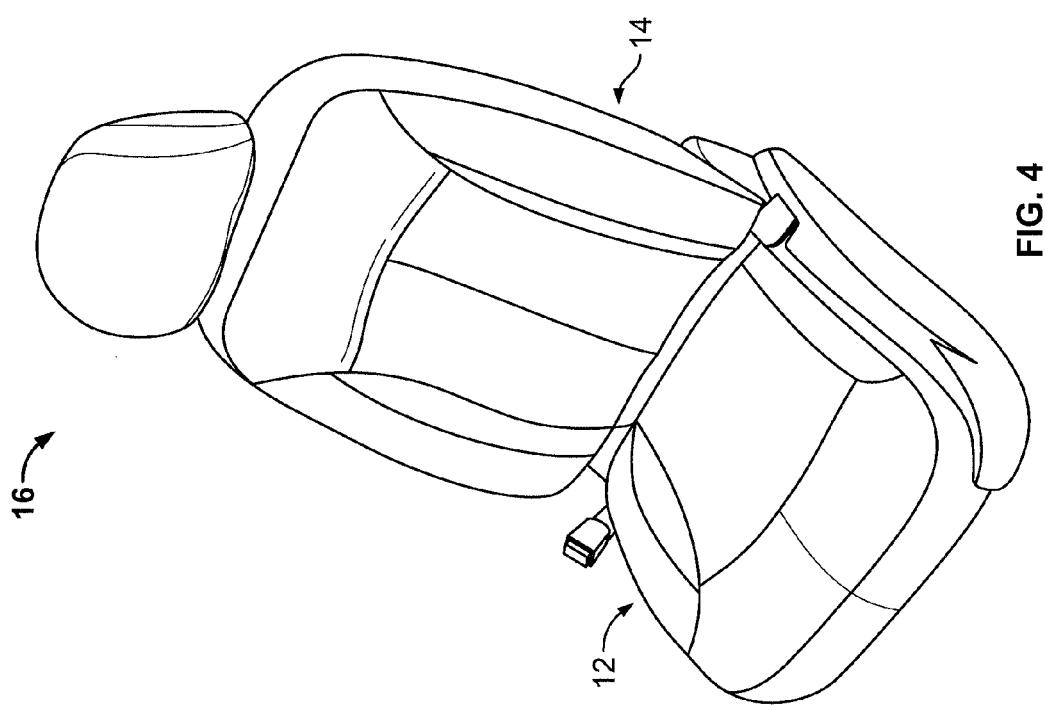

VEHICLE SEAT WITH THERMAL DEVICE

CROSS REFERENCE TO RELATED APPLICATIONS

This application is a U.S. national counterpart application of international application serial No. PCT/US2013/060549 filed Sep. 19, 2013, which claims priority to U.S. Provisional Patent Application No. 61/705,480 filed Sep. 25, 2012. The entire disclosures of PCT/US2013/060549 and U.S. Ser. No. 61/705,480 are hereby incorporated by reference.

BACKGROUND

The present disclosure relates to a vehicle seat, and particularly to seat pads included in seat bottoms and seat backs. More particularly, the present disclosure relates to seat pads configured to provide both a cold sensation and a warming sensation to an occupant sitting on the seat pad.

SUMMARY

According to the present disclosure, a vehicle seat includes an occupant-support base. The occupant-support base includes a cushion cover defining a cushion-receiving space and a cushion positioned to lie in the cushion-receiving space.

In illustrative embodiments, the occupant-support base includes a seat bottom and a seat back extending upwardly from the seat bottom. Each of the seat bottom and seat back includes a cushion cover and a cushion in the cushion-receiving space defined by that cushion cover.

In illustrative embodiments, the occupant-support base further includes a thermal device coupled to a cushion included in either the seat bottom or the seat back to lie in the cushion-receiving space associated with that cushion. The thermal device is configured to provide means for moving heat between a heat-transfer station located in the cushion and an occupant seated on the occupant-support base without convective heat transfer. In an occupant cooling mode, the thermal device moves heat from the occupant seated on the occupant-support base through the cushion cover to a heat sink provided in the heat-transfer station. In an occupant warming mode, the thermal device moves heat from a heat source included in the heat-transfer station through the cushion cover to the seat occupant.

In illustrative embodiments, the thermal device includes a heat-transfer station and a heat conductor. A portion of the heat conductor is positioned to lie between an inner surface of the cushion cover and an outer surface of the cushion to lie in confronting relation with the cushion cover. The heat conductor is coupled to the heat-transfer station to cause heat to flow between the occupant and the heat-transfer station.

In illustrative embodiments, the thermal device may be configured to function in either an occupant cooling mode or an occupant heating mode. When the thermal device is in the occupant cooling mode, heat flows away from the occupant through the heat conductor to provide the occupant with a cooling sensation. When the thermal device is in the occupant heating mode, heat flows from the heat-transfer station through the heat conductor toward the occupant to provide the occupant with a warming sensation.

In a further embodiment, a vehicle seat includes a seat pad included in the seat bottom or the seat back, the vehicle seat comprises an occupant-support base that is one or both of a seat bottom or a seat back, wherein the occupant-support base includes a thermal device and a seat pad, wherein the thermal device includes a heat-transfer station. In that further embodiment, the seat pad includes a cushion, a cushion-receiving space and a cushion cover, wherein the cover defines the cushion-receiving space and covers the cushion. In that further embodiment, the thermal device is coupled to the cushion and positioned to lie in the cushion-receiving space, and wherein the thermal device is configured to optionally provide a cold sensation and a warming sensation to an occupant sitting in the vehicle seat by moving heat between the heat-transfer station coupled to the cushion located in the seat pad and an occupant seated in the vehicle seat without convective heat transfer.

In a further embodiment, the heat-transfer station includes a heat sink and, in an occupant cooling mode, the thermal device moves heat from the occupant through the cushion cover to the heat sink provided in the heat-transfer station.

In a further embodiment, the heat-transfer station includes a heat source and, in an occupant warming mode, the thermal device moves heat from the heat source in the heat-transfer station through the cushion cover to the seat occupant.

In a further embodiment, the thermal device also includes a heat conductor, a portion of which being positioned to lie between an inner surface of the cushion cover and an outer surface of the cushion to lie in confronting relation with the cushion cover.

In a further embodiment, the heat conductor is coupled to the heat-transfer station to cause heat to flow between the occupant and the heat-transfer station.

In a further embodiment, the thermal device is configured to function in either an occupant cooling mode or an occupant heating mode.

In a further embodiment, when the thermal device is in the occupant cooling mode, heat flows away from the occupant through the heat conductor to provide the occupant with the cooling sensation.

In a further embodiment, when the thermal device is in the occupant heating mode, heat flows from the heat-transfer station through the heat conductor toward the occupant to provide the occupant with a warming sensation.

In a further embodiment, the vehicle seat includes a controller coupled to the thermal device and to control whether the thermal device is in an occupant cooling mode or an occupant heating mode. In that further embodiment, the controller is coupled to a control interface that enables selection of the occupant cooling mode or the occupant heating mode.

In a further embodiment, the vehicle seat includes the occupant-support base in the seat bottom and an occupant-support base in the seat back, wherein both the seat base and seat back each include a thermal device and a seat pad, wherein the thermal device includes a heat-transfer station, and wherein each seat pad includes a cushion, a cushion-receiving space and a cushion cover, wherein each cushion cover defines the cushion-receiving space and covers the cushion, and wherein, the thermal device in each occupant-support base is individually controlled by the controller to optionally provide a cold sensation and a warming sensation to the occupant sitting in the vehicle seat In that further embodiment, the controller is coupled to a control interface that enables independent selection of the occupant cooling mode or the occupant heating mode for each of the seat bottom occupant-support base and the seat back occupant support base.

In a further embodiment, the control interface is configured to instruct the controller to provide a plurality of different thermal comfort options for the occupant.

In a further embodiment, the vehicle seat is mounted to a vehicle frame in a vehicle.

In a further embodiment, the cushion is made from foam.

In a further embodiment, the cushion includes an array of outer heat-transfer nodes located on an outer surface of the cushion.

In a further embodiment, the cushion includes an inner layer, a middle layer and an outer layer, and the thermal device is embedded in the outer and middle layers.

In a further embodiment, the heat transfer station includes a fan coupled to the middle layer to exhaust waste heat generated by the thermal device when the thermal device is in a cooling mode.

In a further embodiment, the occupant-support base includes a support pan that is coupled to the seat pad, wherein the support pan is arranged to underlie and support the seat pad.

In a further embodiment, the cushion cover blocks communication of air from the cushion-receiving space to the occupant resting on the occupant-support base.

In a further embodiment, the heat-transfer station includes a heat mover, a heat source, and a heat sink.

In a further embodiment, the heat mover is coupled to the cushion and positioned to lie in spaced-apart relation below an outer surface of the cushion.

In a further embodiment, the heat conductor is coupled to the heat mover and extends between the heat mover and an inner surface of the cushion cover.

In a further embodiment, the heat mover moves thermal energy as a result of creating a temperature gradient.

In a further embodiment, heat is transferred through the cushion cover to the occupant through a combination of conductive heat transfer and radiative heat transfer to provide a warming sensation to occupant.

In a further embodiment, the heat source includes one or more cavities formed in the cushion that contains heated fluid or gel, which is heated by a resistive heater.

In a further embodiment, the fluid is air or liquid.

In a further embodiment, the thermal device includes one or more thermal electric device microchips.

In a further embodiment, the thermal device includes an array of heat conductors along with a corresponding array of heat-transfer nodes and a corresponding array of heat pipes.

In a further embodiment, the thermal device includes a plurality of electrical wires woven through an array of holes formed in an outer layer of cushion.

In a further embodiment, an array of outer heat-transfer nodes is formed by the electrical wires of the thermal device, wherein the electrical wires contact the cushion cover and associated heat pipes are established where the wires extend through the holes and couple to an array of associated thermal electric device microchips.

In a further embodiment, the thermal device includes moisture-management means for managing moisture developed between the occupant and the occupant-support base. In that further embodiment, the moisture-management means includes a source of pressurized, conditioned air directed between the occupant and the occupant-support base.

In a further embodiment, the moisture-management means is implemented in the cushion cover and cushion, which are made of a material configured to communicate moisture away from the occupant.

In a further embodiment, the moisture-management means is implemented in the cushion cover and cushion, which are made from a material that absorbs moisture In a further embodiment, a vehicle seat includes a thermal device, a cushion, a cushion cover that covers the cushion and the thermal device, and a controller coupled to the thermal device, wherein the thermal device is coupled to the cushion, and wherein the thermal device is configured to, under the control of the controller, optionally provide a cold sensation and a warming sensation to an occupant sitting in the vehicle seat by moving heat between the thermal device and an occupant seated in the vehicle seat without convective heat transfer.

In a further embodiment, an occupant-support base for a vehicle seat comprises a cushion cover defining a cushion-receiving space therein, a cushion positioned to lie in the cushion-receiving space, and a thermal device coupled to the cushion and arranged to lie in the cushion-receiving space. The thermal device is configured to provide means for moving heat between a heat-transfer station located in the cushion and an occupant seated on the occupant-support base without convective heat transfer in one of a cooling mode in which heat moves from the occupant seated on the occupant-support base through the cushion cover to a heat sink provided in the heat-transfer station and a warming mode in which heat moves from a heat source included in the heat-transfer station through the cushion cover to the seat occupant.

In a further embodiment, the cushion cover includes an inner surface arranged to face toward the cushion and an outer surface arranged to face away from the cushion. The thermal device includes the heat-transfer station and a heat conductor and a portion of the heat conductor is positioned to lie between the inner surface of the cushion cover and an outer surface of the cushion to lie in confronting relation with the cushion cover.

In a further embodiment, the heat conductor is coupled to the heat-transfer station to cause heat to flow between the occupant and the heat-transfer station through the heat conductor.

In a further embodiment, the heat-transfer station includes a heat mover coupled to the cushion and positioned to lie in spaced-apart relation below an outer surface of the cushion, a heat source, and a heat sink.

In a further embodiment, the heat conductor is coupled to the heat mover and extends between the heat mover and the inner surface of the cushion cover.

In a further embodiment, the occupant provides the heat sink when the heating sensation is provided to the occupant.

In a further embodiment, the heat mover moves thermal energy as a result of creating a temperature gradient.

In a further embodiment, the occupant-support base provides a time to thermal sensation to the occupant sitting on the occupant-support base in less than about 2 minutes after the occupant-support base has been exposed to a hot temperature of about 50 degrees Fahrenheit for about two hours and the thermal device is in a cooling mode.

In a further embodiment, the time to thermal sensation is less than about 1 minute 40 seconds.

In a further embodiment, the occupant-support base provides a time to thermal sensation to the occupant sitting on the occupant-support base in less than about 2 minutes after the occupant-support base has been exposed to a cold temperature of about −10 degrees Fahrenheit for about two hours and the thermal device is in a heating mode.

In a further embodiment, the time to thermal sensation is less than about 1 minute.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view and diagrammatic view of a vehicle seat showing that the vehicle seat includes a first occupant-support base configured as a seat bottom and a second occupant-support base configured as seat back and suggesting that each occupant-support base includes a cushion, a cushion cover, and a thermal device configured to provide an occupant (not shown) seated on the occupant-support base with a cold sensation when the thermal device is in a cooling mode and a warming sensation when the thermal device is in a heating mode;

FIG. 2 is a partial perspective view and diagrammatic view showing that the thermal device includes a heat mover and a heat conductor including an outer-heat-transfer node and a heat pipe and suggesting that the occupant controls the thermal device via a user input that is coupled to a controller to cause the thermal device to assume the heating mode in which the heat mover moves heat toward the occupant as suggested in FIG. 14 or the cooling mode in which the heat mover moves heat away from the occupant as suggested in FIG. 15;

FIG. 3 is a perspective view and diagrammatic view of a vehicle seat in accordance with the present disclosure mounted to a vehicle frame in a vehicle showing that an upper thermal device may be mounted in a seat back, a lower thermal device may be mounted in a seat bottom, and a common user input and controller may be used to operate the upper thermal device independently of the lower thermal device;

FIG. 4 is a photograph of a vehicle seat in accordance with the present disclosure;

FIG. 5A is a photograph of a seat back included in the vehicle seat of FIG. 4 with the cushion cover removed to reveal the foam cushion and an array of outer heat-transfer nodes located on an outer surface of the cushion and suggesting that the outer heat-transfer nodes are arranged to lie in confronting relation with the cushion cover;

FIG. 5B is a photograph of a seat bottom included in the vehicle seat of FIG. 4 with the cushion cover removed to reveal the cushion and an array of outer heat-transfer nodes located on an outer surface of the foam cushion and suggesting that the outer heat-transfer nodes are arranged to lie in confronting relation with the cushion cover;

Figure 7:
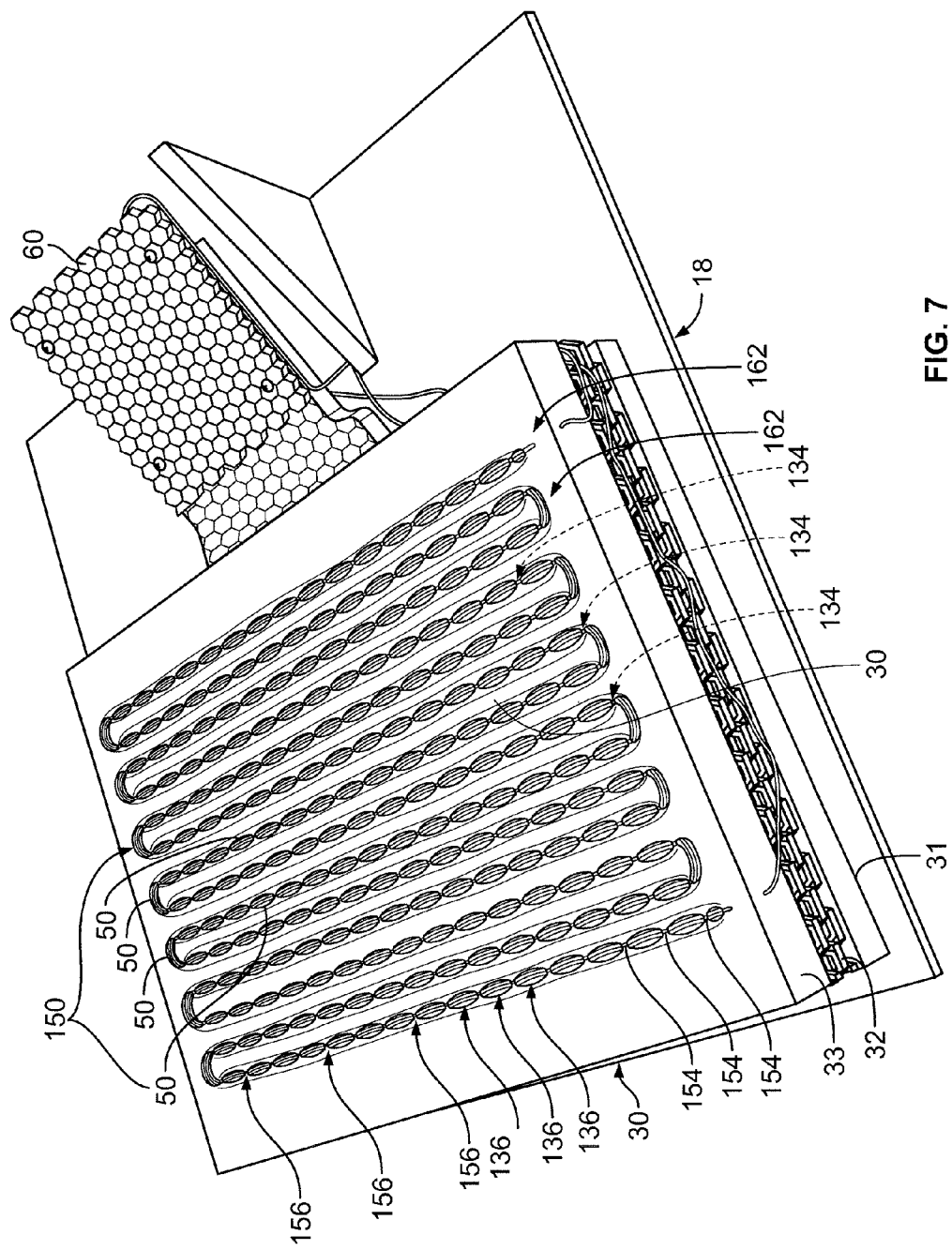
FIG. 7 is another photograph of the occupant-support base of FIG. 6 showing that the thermal device further includes a fan coupled to the middle layer to exhaust waste heat generated by the heat mover when the thermal device is in the cooling mode.
Figure 8:
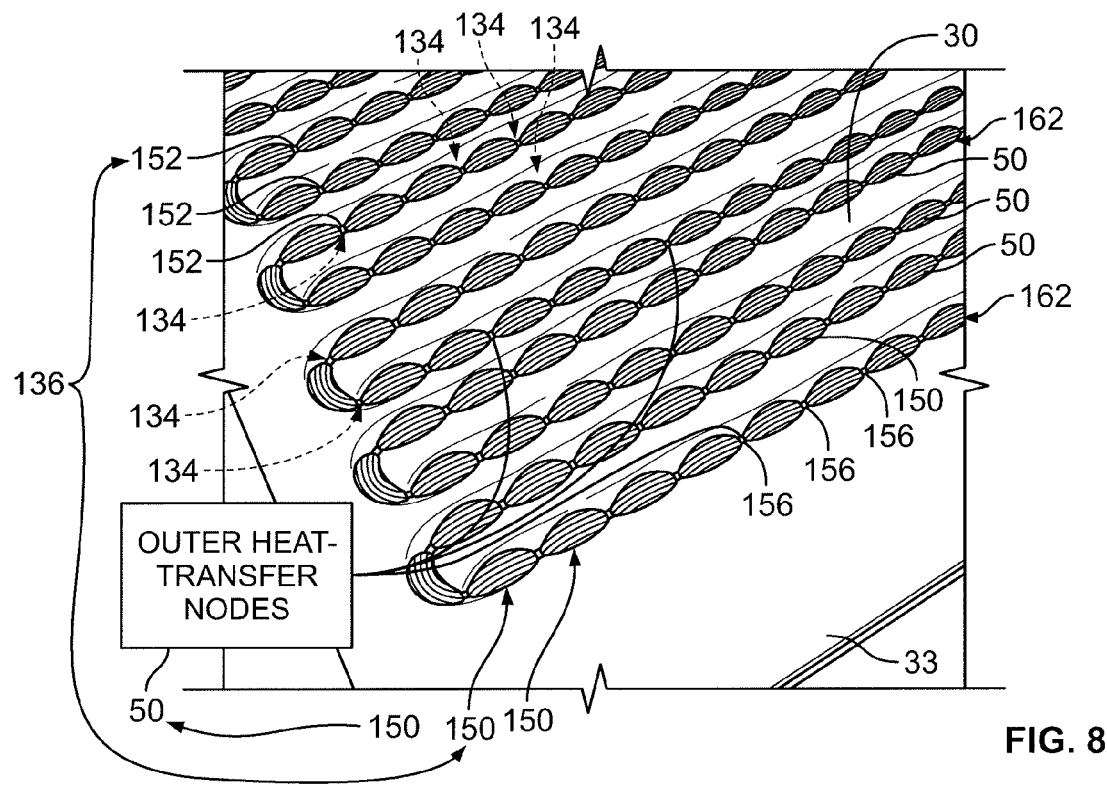
Figure 9:
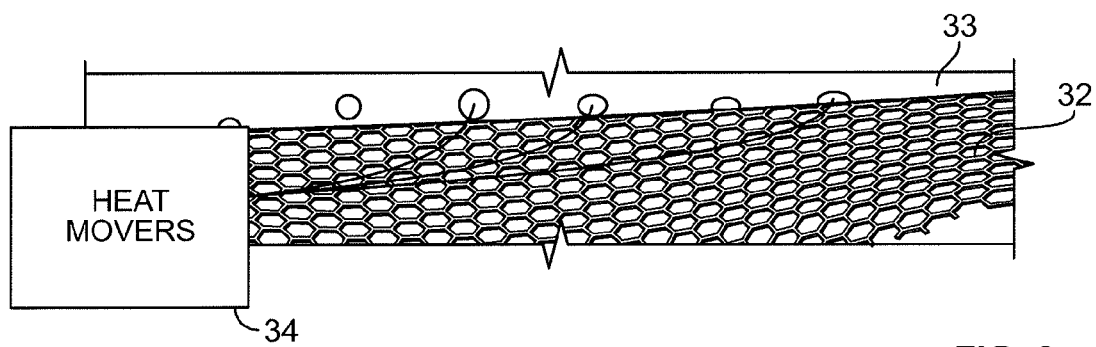
Figure 10:
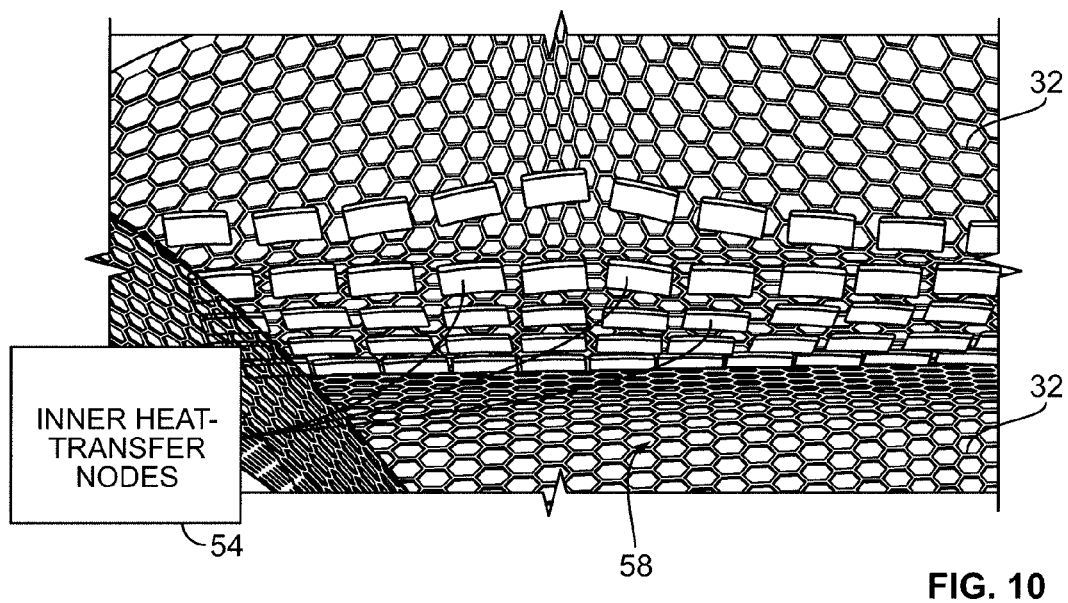
Figure 12:
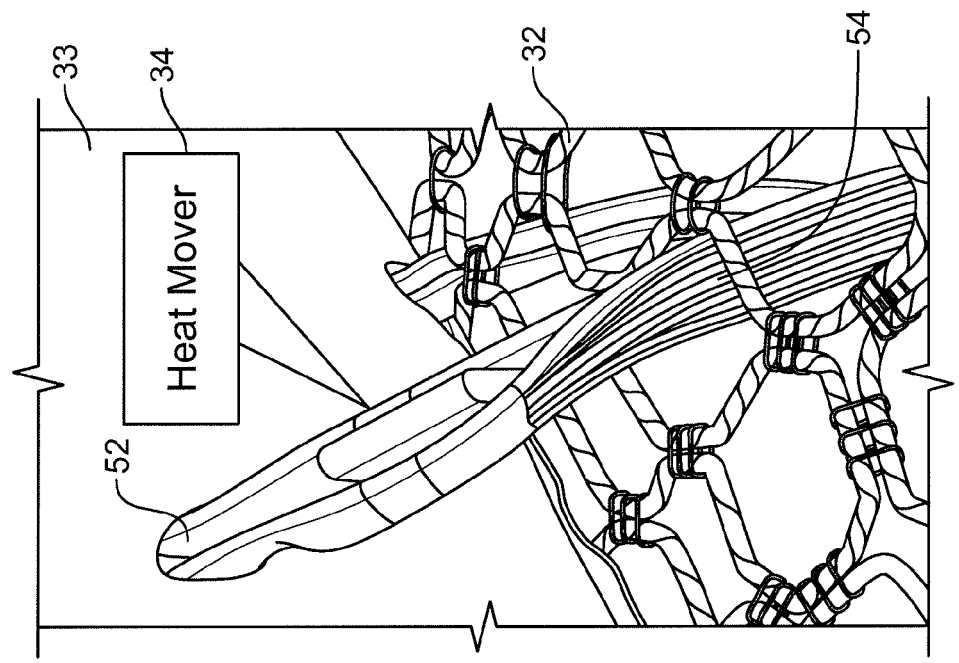
Figure 11:
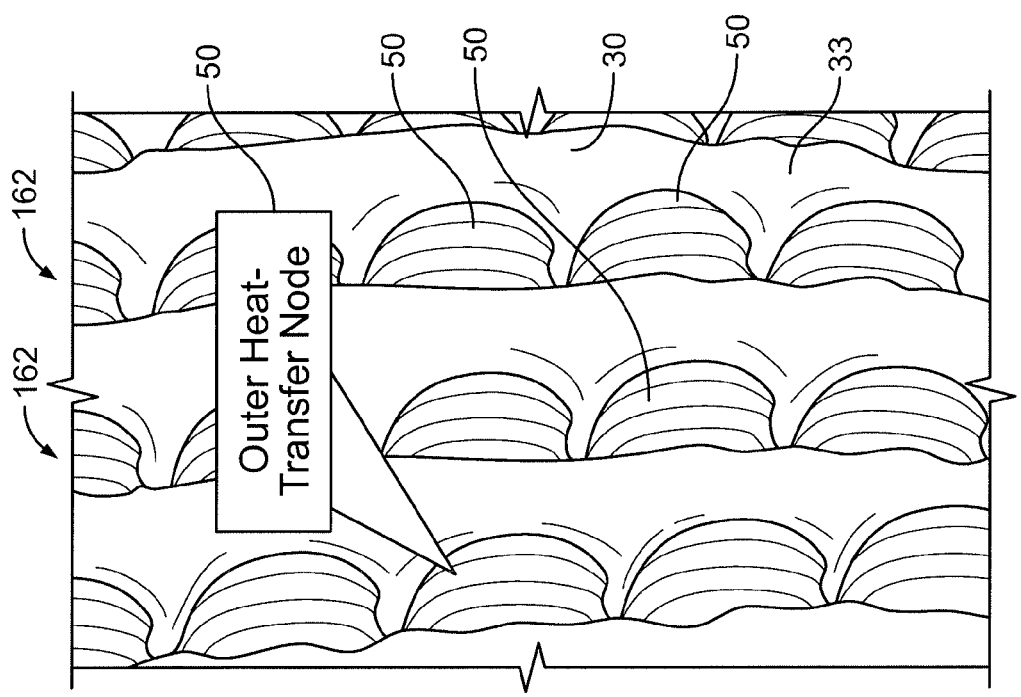
Figure 13:
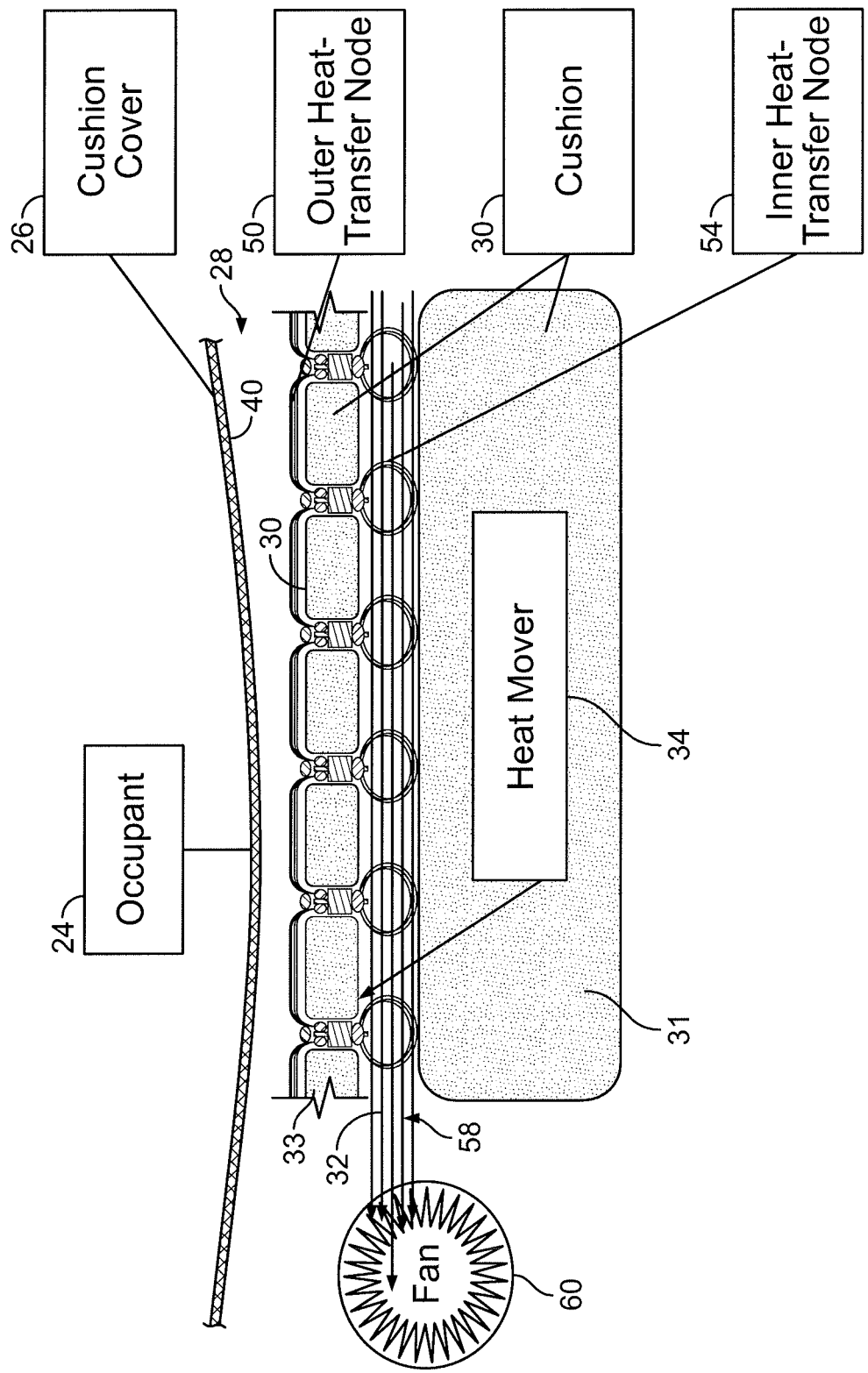
Figure 14:
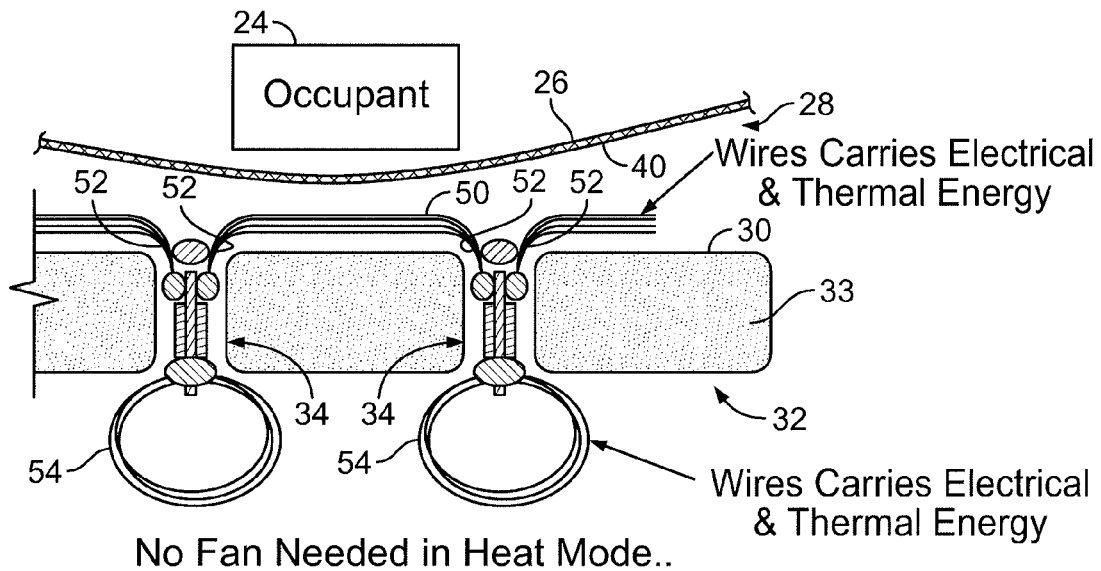
Figure 15:
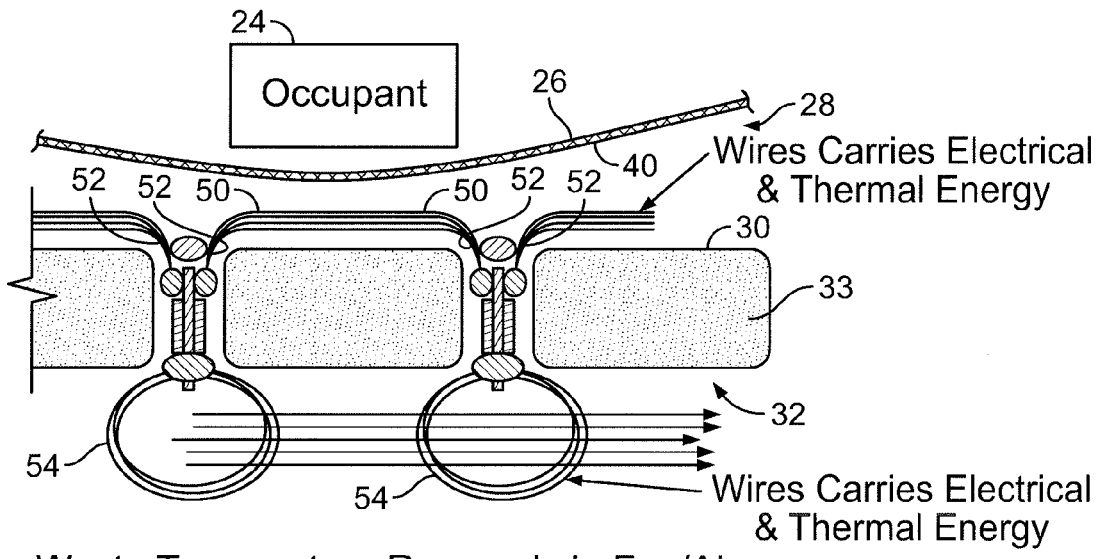
Figure 16:
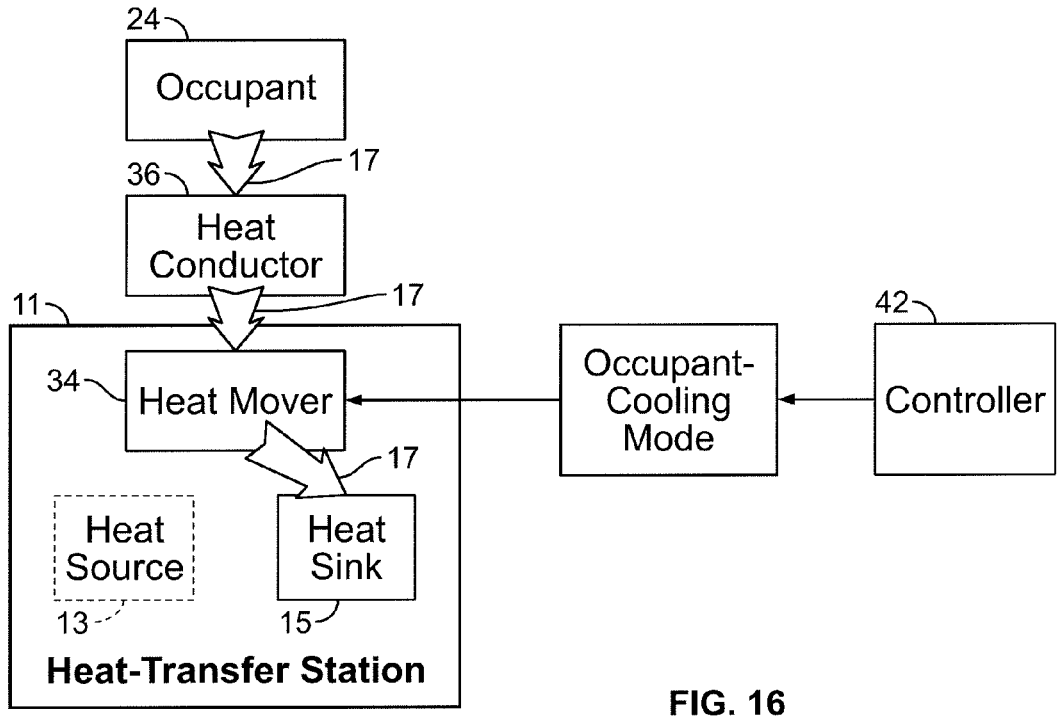
Figure 17:
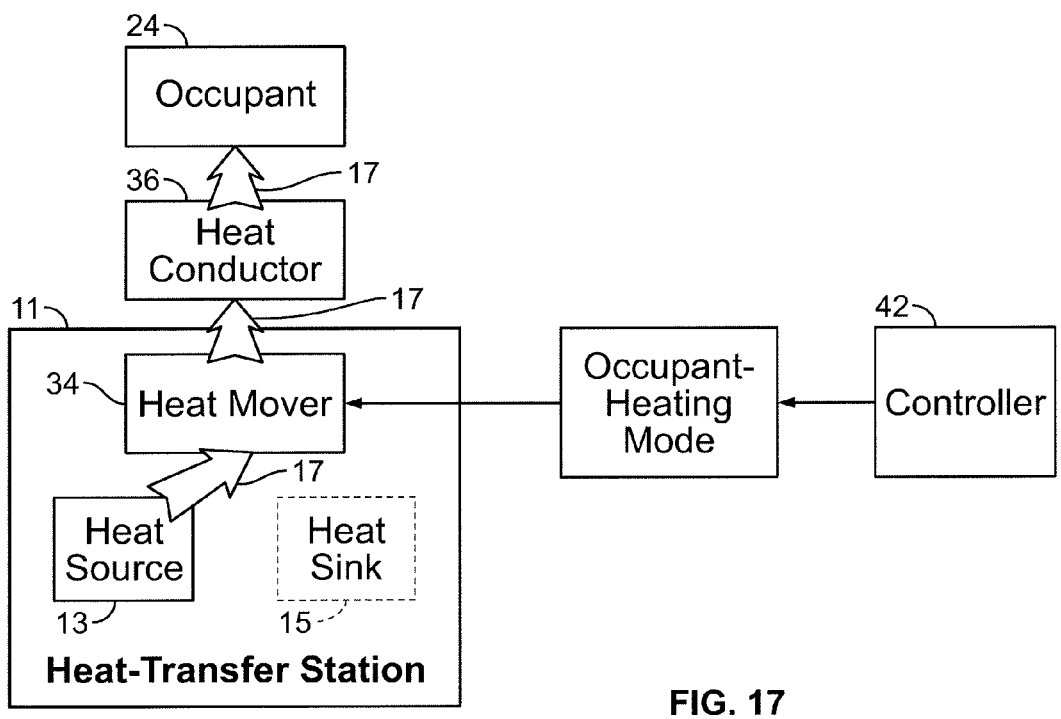

FIG. 8 is a photograph of the occupant-support base of FIG. 7 showing an array of outer heat-transfer nodes formed as a result of weaving a series of electrical wires through holes formed in the outer layer of the cushion to cause an upper heat-transfer node to be established where the series of electrical wires contact the cushion cover and associated heat pipes to be established where the series of wires extend through the holes and are coupled to the heat mover as suggested in FIG. 9;

FIG. 9 is a photograph of the occupant-support base of FIG. 8 with the outer layer of the cushion spread apart from the middle layer of the cushion showing that the heat pipes are coupled to the heat movers;

FIG. 10 is a photograph of the occupant-support base of FIGS. 8 and 9 showing that the series of electrical wires extend into the middle layer to form a lower heat-transfer node in the middle layer of the cushion;

FIG. 11 is an enlarged portion of the photograph of FIG. 8 showing a row of heat-transfer nodes included in the array of heat-transfer nodes and that each outer heat-transfer node is formed between two neighboring holes formed in the outer layer of the cushion;

FIG. 12 is an enlarged portion of the photograph of FIG. 9 showing that the heat mover is positioned to lie below an outer surface of the outer layer of the cushion and that each outer heat-transfer node is coupled to an associated heat mover;

FIG. 13 is a diagrammatic view of an occupant-support base in accordance with the present disclosure showing that the occupant-support base includes a seat pad including a cushion cover configured to engage an occupant sitting on the occupant-support base and a cushion arranged to lie in a cushion-receiving space defined by the cushion cover and support the occupant and a thermal device including an array of heat movers positioned to lie in spaced-apart relation below an outer surface of the cushion, an array of outer upper heat-transfer nodes positioned to lie between the outer surface of the cushion and the cushion cover to transfer heat between the occupant and the heat movers without the use of convection, and an array of inner heat-transfer nodes positioned to locate the heat movers between the outer and inner heat-transfer nodes;

FIGS. 14 and 15 are a series of views showing how heat moves when the thermal device is in the heating mode as suggested in FIG. 14 and the cooling mode as shown in FIG. 15;

FIG. 14 is a view similar to FIG. 13 showing the thermal device in the heating mode in which heat is transferred through the outer layer of the cushion by the heat pipes to the outer heat-transfer nodes that are in confronting relation with the cushion cover and the occupant;

FIG. 15 is a view similar to FIG. 14 showing the thermal device in the cooling mode in which heat is collected from the occupant at the outer heat-transfer nodes and moved through the outer layer of the cushion to the middle layer of the cushion by the heat pipes where the waste heat is transferred to air moved through the middle layer by a fan;

FIG. 16 a diagrammatic view showing that thermal energy (heat) flows from the occupant, through the heat conductor, through the heat mover, and to a heat sink in the cushion when the thermal device is in the occupant-cooling mode; and FIG. 17 is a view similar to FIG. 16 showing that thermal energy (heat) flows from the heat source in the cushion, through the heat mover, through the heat conductor, and to the occupant when the thermal device is in the occupant-heating mode.

DETAILED DESCRIPTION

Figure 1:
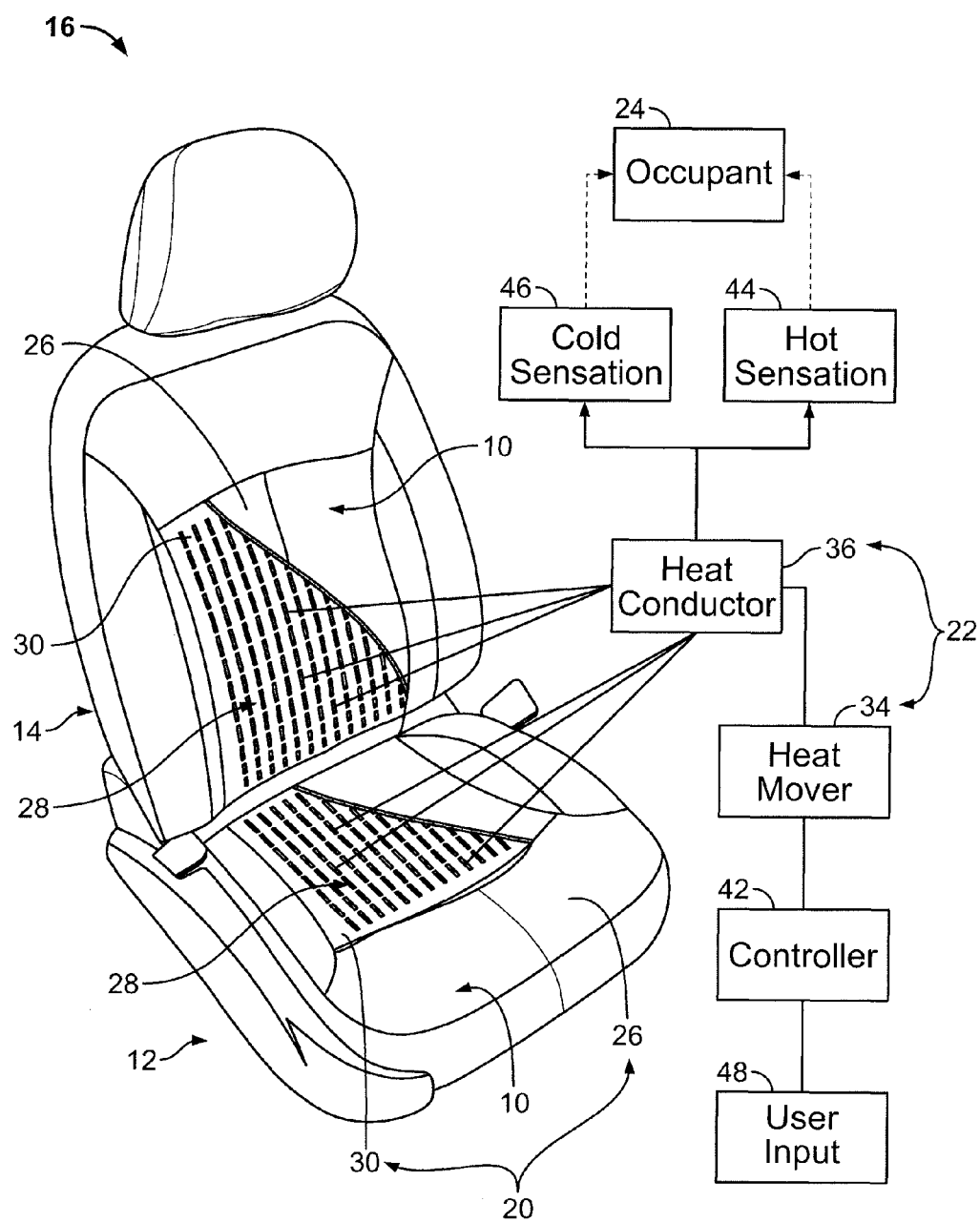

An occupant-support base 10, in accordance with the present disclosure, may be used as a seat bottom 12 or a seat back 14 in a vehicle seat 16 as shown, for example, in FIGS. 1 and 4. Occupant-support base 10 includes a seat pad 20 and a thermal device 22 as suggested in FIGS. 1-3 and 6. Seat pad 20 may be coupled to a support pan 18 that is arranged to underlie and support seat pad 20. Thermal device 22 is coupled to seat pad 20 and is configured to provide means for moving heat 17 between a heat-transfer station 11 and an occupant 24 seated on occupant-support base 10 without convective heat transfer as suggested in FIGS. 14-17.

Seat pad 20 includes, for example, a cushion cover 26 defining a cushion-receiving space 28 therein and a cushion 30 as suggested in FIG. 1. Cushion 30 is positioned to lie in cushion-receiving space 28. Thermal device 22 is coupled to cushion 30 and is positioned to lie in cushion-receiving space 28 with cushion 30. In one illustrative example, cushion cover 26 is generally airtight and blocks communication of air from cushion-receiving space 28 to occupant 24 resting on occupant-support base 10.

Thermal device 22 includes heat-transfer station 11 and a heat conductor 36 as shown in FIGS. 1-3, 16, and 17. Heat-transfer station 11 is coupled to cushion 30 and positioned to lie in spaced-apart relation below an outer surface 38 of cushion 30. Heat conductor 36 is coupled to heat-transfer station 11 to extend between heat-transfer station 11 and an inner surface 40 of cushion cover 26 as shown in FIGS. 13-15.

Heat-transfer station 11 includes a heat mover 34, a heat source 13, and a heat sink 15 as shown in FIGS. 16 and 17. Heat mover 34 is coupled to cushion 30 and positioned to lie in spaced-apart relation below an outer surface 38 of cushion 30. Heat conductor 36 is coupled to heat mover 34 to extend between heat mover 34 and an inner surface 40 of cushion cover 26 as shown in FIGS. 13-15. Heat mover 34 is a mover of thermal energy as a result of creating a temperature gradient. In one illustrative example, heat mover 34 establishes a temperature gradient of about 10° F.

Thermal device 22 may be arranged in one of a heating mode and a cooling mode as shown in FIGS. 14 and 15. Thermal device 22, when in the heating mode, causes heat mover 34 to move heat 17 from heat source 13, through heat conductor 36 to cushion cover 26 as suggested in FIG. 17. There, heat 17 is transferred through cushion cover 26 to occupant 24 through a combination of conductive heat transfer and radiative heat transfer to provide a warming sensation 44 to occupant 24. Thermal device 22, when in the cooling mode, causes heat mover 34 to move heat 17 collected from occupant 24 through heat conductor 36 and into heat sink 15 to provide a cold sensation 46 to occupant 24.

In one illustrative example, heat source 13 is one or more cavities 58 formed in cushion 30 that contain air. In another example, the heat source is one or more cavities formed in the cushion and filled with air heated by a resistive heater. In still yet another example, the heat source may be a heat exchanger that is filled with a hot fluid such as air, water, or any other suitable medium that is coupled to heat mover 34.

In another illustrative example, heat sink 15 is one or more cavities 58 formed in cushion 30 that contain air. In another example, the cavities may be filled with water, gel, or any other suitable medium.

The heat-transfer station may include a heat sink separate from a heat source. As shown, for example in FIG. 10, both the heat sink and the heat source may be combined into cavity 58 formed in cushion 30. As a result, heat 17 is drawn from the air in cavity 58 when thermal device 22 is in the occupant heating mode. Heat is rejected to the air in cavity 58 when thermal device 22 is in the occupant cooling mode.

Figure 2:
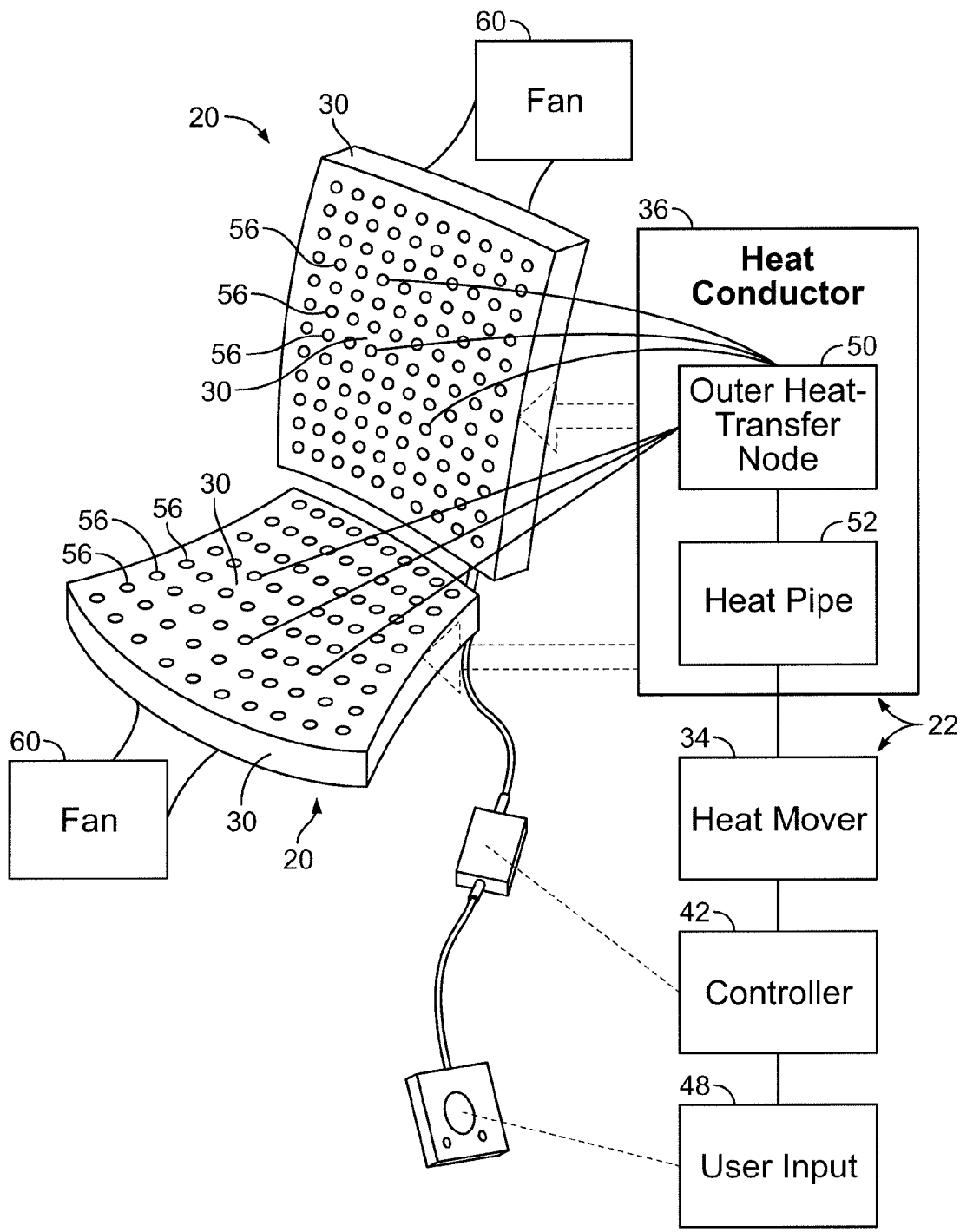
Figure 3:
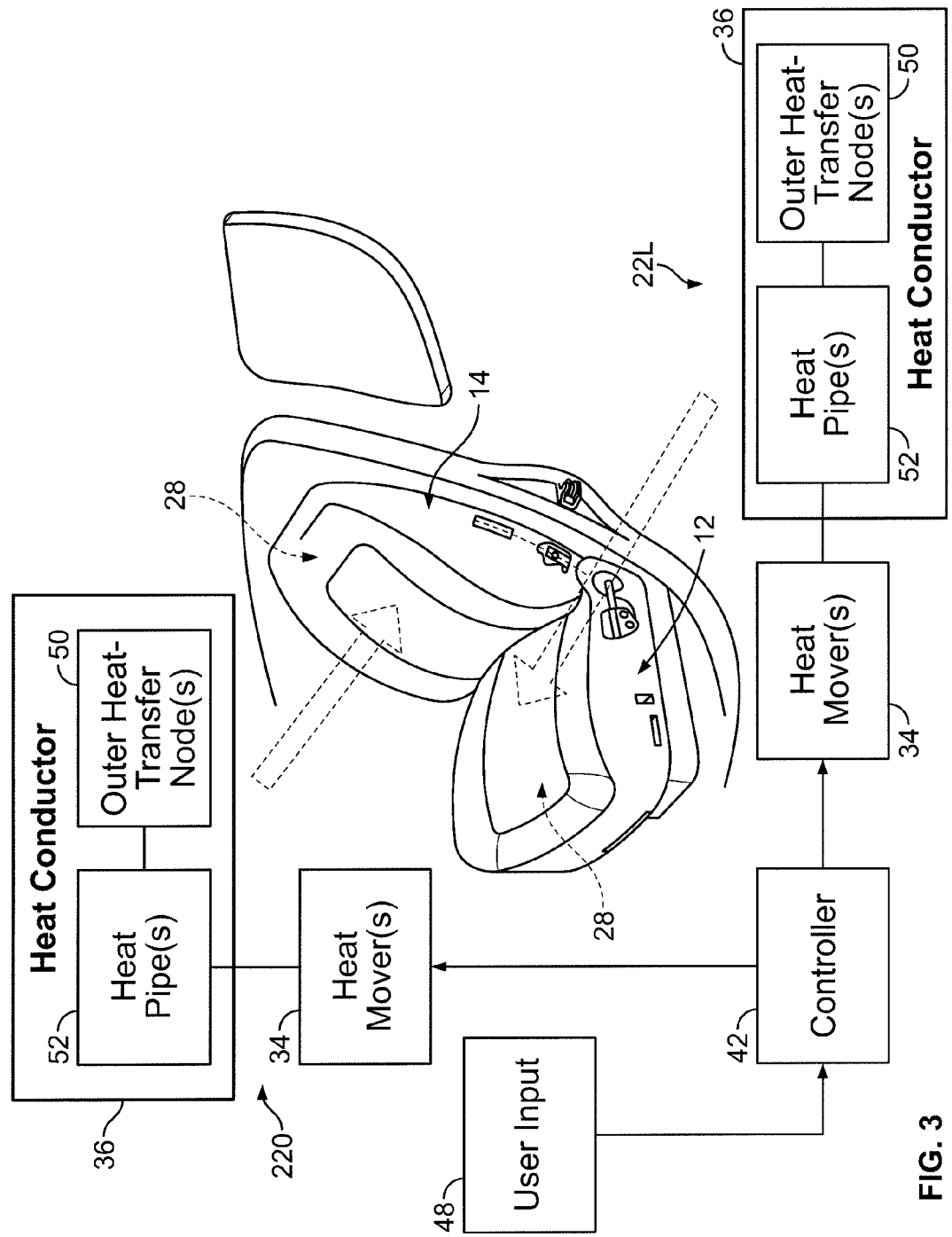

Heat mover 34 is arranged in either the occupant heating mode or occupant the cooling mode by a controller 42 coupled to heat mover 34 as shown in FIGS. 1-3. A user input 48 is coupled to controller 42 and configured to transmit commands received from occupant 24 to controller 42 to cause controller 42 to command heat mover 34 to assume either the heating mode or the cooling mode. As shown in FIG. 3, user input 48 may be coupled to controller 42 to control an upper thermal device 22U associated with seat back 14 independently of a lower thermal device 22L associated with seat bottom 12. As a result, one user input 48 and one controller may be used to control both upper and lower thermal device 22U, 22L.

In an illustrative example, heat mover 34 is a thermal electric device microchip provided by TEMPRONICS™ of Tucson, Ariz. Reference is hereby made to U.S. application Ser. No. 12/367,965, filed on Feb. 9, 2009 and titled ENERGY CONVERSION DEVICE, Ser. No. 13/101,015, filed May 4, 2011 and titled DISTRIBUTED THERMO-ELECTRIC STRING AND INSULATING PANEL, Ser. No. 13/131,535, filed on May 26, 2011 and titled DEVICE FOR ENERGY CONVERSION, ELECTRICAL SWITCHING, AND THERMAL SWITCHING, and Ser. No. 13/541,530, filed on Jul. 3, 2012 and titled INTEGRATION OF DISTRIBUTED THERMOELECTRIC HEATING AND COOLING and International (PCT) Application Nos. PCT/US11/51227, filed on Sep. 12, 2011 and titled DISTRIBUTED THERMOELECTRIC STRING AND INSULATING PANEL AND APPLICATIONS FOR LOCAL HEATING, COOLING, AND POWER GENERATION FROM HEAT and PCT/US12/45443, filed on Jul. 3, 2012 and titled INTEGRATION OF DISTRIBUTED THERMO-ELECTRIC HEATING AND COOLING for disclosure relating to such thermal electric device microchips, which applications are hereby incorporated in their entirety.

Heat conductor 36 includes an outer heat-transfer node 50, a heat pipe 52, and an inner heat-transfer node 54 as shown in FIGS. 13-15. Outer heat-transfer node 50 is positioned to lie between outer surface 38 of cushion 30 and inner surface 40 of cushion cover 26 as suggested in FIGS. 1 and 13-15. Inner heat-transfer node 54 is positioned to lie in spaced-apart relation to outer heat-transfer node 50 and lie below outer surface 38 of cushion 30. Heat pipe 52 is arranged to extend between and interconnect outer heat-transfer node 50 and heat mover 34 as shown in FIGS. 12-15. Inner heat-transfer node 54 is coupled to heat mover 34 and positioned to locate heat mover 34 between inner heat-transfer node 54 and heat pipe 52.

In one example, inner heat-transfer node 54 is located in or coupled to heat source 13 and heat sink 15 of heat-transfer station 11. As suggested in FIG. 10, inner heat-transfer node 54 is located in cavity 58 which functions as both heat source 13 and heat sink 15. In this example, heat-transfer station 11 transfer heat to cavity 58 through convective heat transfer.

Figure 6:
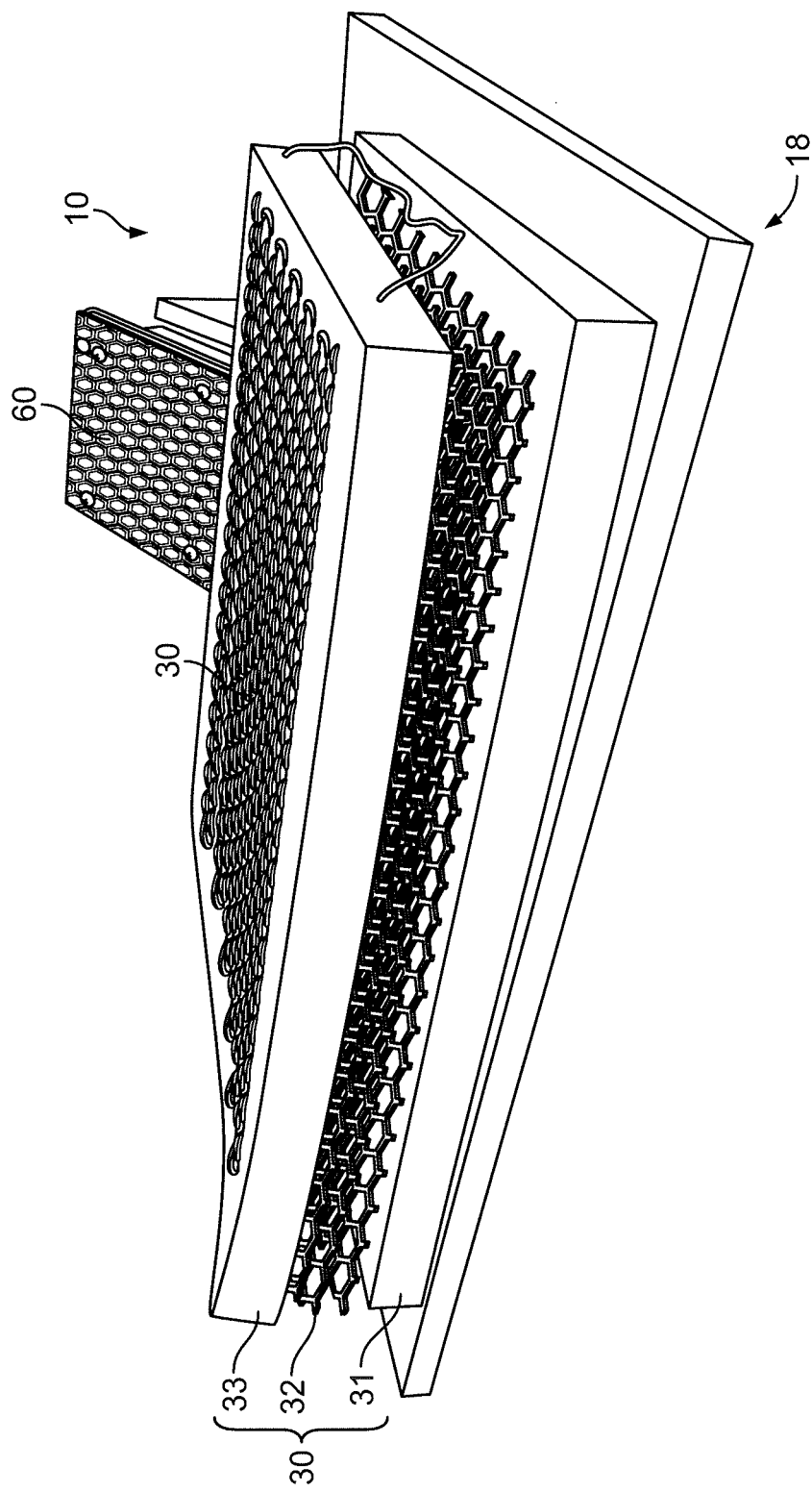
FIG. 6 is a photograph of another embodiment of an occupant-support base in accordance with the present disclosure showing that the occupant-support base includes, from bottom to top, a seat pan, a cushion including an inner layer, a middle layer, and an outer layer, and the thermal device embedded in the outer and middle layers as suggested in FIGS. 9, 10, and 12.

Thermal device 22 is coupled to cushion 30 to move heat 17 between occupant 24 and cushion 30 through cushion cover 26 to cause an amount of time till thermal sensation to be minimized. As shown in FIGS. 6, 7, and 13, cushion 30 includes an inner layer 31, a middle layer 32, and an outer layer 33 as shown in FIGS. 6, 7, and 13. Inner layer 31 may be arranged to lie on and be supported by support pan 18. Middle layer 32 is positioned to lie between inner layer 31 and outer layer 33. Outer layer 33 is positioned to lie between cushion cover 26 and middle layer 32 as shown, for example, in FIGS. 6, 7, and 13. In some embodiments, inner layer 31 may be omitted.

As shown in FIG. 13, outer heat-transfer node 50 is positioned to lie in confronting relation with cushion cover 26. Heat mover 34 is spaced apart from outer heat-transfer node 50 and positioned to lie in middle layer 32 as shown in FIGS. 9 and 12-13. Heat pipe 52 is arranged to extend through a hole 56 formed in outer layer 33 of cushion 30 to interconnect outer heat-transfer node 50 and heat mover 34. Inner heat-transfer node 54 is coupled to heat mover 34 and positioned to lie in middle layer 32 as shown in FIGS. 10 and 13-15.

In an example of use, occupant 24 provides a command via user input 48 to controller 42 to cause heat mover 34 to be in the heating mode. When heat mover 34 is in the heating mode, heat is moved from heat mover 34 through heat pipe 52 to outer heat-transfer node 50 without the use of convection. Heat continues to move from outer heat-transfer node 50 through cushion cover 26 and into occupant 24 through conductive heat transfer and radiative heat transfer as suggested in FIG. 14.

In another example of use, occupant 24 provides a different command via user input 48 to controller 42 to cause heat mover 34 to be in the cooling mode. When heat mover 34 is in the cooling mode, heat is collected by outer heat-transfer node 50 and communicated through outer layer 33 of cushion 30 by heat pipe 52 to inner heat-transfer node 54. There, inner heat-transfer node 54 rejects waste heat to middle layer 32 of cushion 30. In an example, middle layer 32 includes cavity 58 through which air may be moved by a fan 60 as suggested in FIGS. 2, 6, 7, 10, 12, 13, and 15.

As shown, for example, in FIGS. 7 and 8, a thermal device in accordance with the present disclosure includes an array 136 of heat conductors 36 and an array 134 of heat movers 34. Array 136 of heat conductor 36 includes an array 150 of outer heat-transfer nodes 50 and an associated array 152 of heat pipes 52. The thermal device may be established by weaving a series of electrical wires through an array 156 of holes 56 formed in outer layer 33 of cushion 30. As a result, outer heat-transfer nodes 50 are established where the series of electrical wires contact cushion cover 26. At the same time, associated heat pipes 52 are established where the series of wires extend through holes 56 and couple to associated heat movers 34 as suggested in FIG. 9.

Array 150 of outer heat-transfer nodes 50 includes one or more rows 162 of outer heat-transfer nodes 50 spaced-apart from one another as shown in FIG. 11. Each outer heat-transfer node 50 is formed between two neighboring holes 56 formed in outer layer 33 of cushion 30. In one example, array 156 of holes 56 includes 224 holes.

In one example of manufacturing occupant-support base 10, the series of wires are threaded down through a first hole 56, coupled to heat mover 34, arranged to form inner heat-transfer node 54, coupled again to heat mover 34, and threaded back through first hole 56. The series of wires are then laid across outer surface 38 of cushion 30 and threaded through a neighboring second hole 56 where the same process is performed again as was performed with first hole 56. Each hole 56 in array 156 has the same process performed until array 136 of heat conductors 36 and array 134 of heat movers 34 is established. All heat movers 34 in array 134 are in the same electrical circuit and all heat movers 34 are in either heating mode or cooling mode at the same time.

As shown in FIG. 3, a common user input 48 and controller 42 may be used to control upper thermal device 22U and lower thermal device 22L. Upper thermal device 22U is on a separate electrical circuit from lower thermal device 22L. As a result, each thermal device on its own separate electrical circuit may be operated independently of every other thermal device. In another example, a seat bottom may have at least two thermal devices operating on separate electrical circuits.

In some embodiments, the thermal device may include moisture-management means for managing moisture developed between the occupant and the occupant-support base. In one example, the moisture-management means includes a source of pressurized, conditioned air directed between the occupant and the occupant-support base. The pressurized, conditioned air may be cooled to remove ambient humidity and then heated so that a capacity for evaporating moisture between the occupant and the occupant-support base is maximized. In another example, the cushion cover and cushion may be made from a material configured to communicate moisture away from the occupant toward the middle layer of the cushion where the moisture may be carried away by air. In still yet another example, the cushion cover and a portion of the cushion may be made from another material that absorbs moisture when the occupant is present and releases moisture when the occupant exits the vehicle.

A thermal device in accordance with the present disclosure minimizes efficiencies in moving thermal energy to and from the occupant. Proximity and contact with the outer heat-transfer nodes of the thermal device maximize efficiency when viewed as a measure of time to thermal sensation. Time to thermal sensation is a metric that measures an amount of time it takes for an occupant sitting in a vehicle seat to feel the occupant-support base providing or removing heat as desired by the occupant.

In one example, the occupant-support base is placed in a hot chamber at 50° C. for two hours. The occupant-support base is then removed from the hot chamber and the occupant sits on the occupant-support base. The thermal device is then commanded to assume the cooling mode. Time to thermal sensation was measured at about 1 minute and 38 seconds.

In another example, the occupant-support base is placed in a cold chamber at −10° C. for two hours. The occupant-support base is then removed from the cold chamber and the occupant sits on the occupant-support base. The thermal device is then commanded to assume the heating mode. Time to thermal sensation was measured at about 1 minute and 1 second.

A vehicle seat in accordance with the present disclosure includes a seat bottom and a seat back coupled to the seat bottom. The vehicle seat further includes a distributed thermal electric array that provides heating and cooling to the seat's occupant-support surface, and thus, to the seat's occupant. The seat back and the seat bottom may each include a module that includes the distributed thermal electric array. In one example, the module includes various layers that support the distributed thermal electric array, provide an air space for rejection of humidity and waste heat. The module may further include a fan to move air through the air space to remove negative temperature from the non-occupant side of the modules. It may also use fans for the removal of humidity. The distributed thermal electric array may also include self-monitoring devices. These self-monitoring devices provide intelligent control of the system.

The module may also include an electronic control unit (ECU) to control the module in a way that is minimizes complexity for the occupant. The module may be configured via the controller 42 to provide various different thermal comfort options for the occupant. In one example, the seat bottom could be in the cooling mode while the seat back is off and not in either the cooling or the heating mode. In another example, the seat bottom could be off and the seat back could be in the heating mode.

The module may further include a control interface 48. The control interface 48 may be located on the seat 26 or remotely to other areas of the vehicle such as the steering wheel, center console, the instrument panel, or any other suitable location.

As explained above, the vehicle seat 16 may include a seat pad 20 included in the seat bottom 12 or seat back 14, wherein the vehicle seat 16 comprises an occupant-support base 10 that is one or both of the seat bottom 12 or the seat back 14. The occupant-support base 10 may include a thermal device 22 and a seat pad 20 and the thermal device 22 may include a heat-transfer station 11. In that further embodiment, the seat pad 20 may include a cushion 30, a cushion-receiving space 28, and a cushion cover 26. The cover 26 may define the cushion-receiving space 28 and cover the cushion 30. In that further embodiment, the thermal device 22 may be coupled to the cushion 30 and positioned to lie in the cushion-receiving space 28. The thermal device 22 may be configured to optionally provide a cold sensation 46 and a warming sensation 44 to an occupant 24 sitting in the vehicle seat 16 by moving heat between the heat-transfer station 11 coupled to the cushion 30 located in the seat pad 20 and an occupant 24 seated in the vehicle seat 16 without convective heat transfer.

The heat-transfer station 11 may include a heat sink 15 and, in an occupant cooling mode, the thermal device 22 moves heat from the occupant 24 through the cushion cover 26 to the heat sink 15 provided in the heat-transfer station 11.

The heat-transfer station 11 may include a heat source 13 and, in an occupant warming mode, the thermal device 22 moves heat from the heat source 13 in the heat-transfer station 11 through the cushion cover 26 to the seat occupant 24.

The thermal device 22 may also include a heat conductor 36, a portion of which being positioned to lie between an inner surface 40 of the cushion cover 26 and an outer surface of the cushion 30 to lie in confronting relation with the cushion cover 26.

The heat conductor 36 may be coupled to the heat-transfer station 11 to cause heat 17 to flow between the occupant 24 and the heat-transfer station 11.

The thermal device 22 may be configured to function in either an occupant 24 cooling mode or an occupant heating mode.

As explained above, when the thermal device 22 may be in the occupant 24 cooling mode, heat 17 flows away from the occupant 24 through the heat conductor 36 to provide the occupant 24 with the cooling sensation. Additionally, when the thermal device 22 is in the occupant 24 heating mode, heat 17 flows from the heat-transfer station 11 through the heat conductor 36 toward the occupant 24 to provide the occupant 24 with a warming sensation 44.

The vehicle seat 16 may include a controller 42 coupled to the thermal device 22 to control whether the thermal device 22 is in an occupant 24 cooling mode or an occupant 24 heating mode. In that further embodiment, the controller 42 may be coupled to a control interface 48 that enables selection of the occupant 24 cooling mode or the occupant 24 heating mode.

The vehicle seat 16 may include the occupant-support base 10 in the seat bottom 12 and an occupant-support base 10 in the seat back 14. Both the seat base and seat back 14 each include a thermal device 22 and a seat pad 20, wherein the thermal device 22 may include a heat-transfer station 11, and wherein each seat pad 20 may include a cushion 30, a cushion-receiving space 28, and a cushion cover 26. Each cushion cover 26 defines the cushion-receiving space 28 and covers the cushion 30, and wherein, the thermal device 22 in each occupant-support base 10 is individually controlled by the controller 42 to optionally provide a cold sensation 46 and a warming sensation 44 to the occupant 24 sitting in the vehicle seat 16. In that further embodiment, the controller 42 may be coupled to a control interface 48 that enables independent selection of the cooling mode or the heating mode for each of the seat bottom-specific occupant-support base 10 and the seat back-specific occupant support base 10.

The control interface 48 may be configured to instruct the controller 42 to provide a plurality of different thermal comfort options for the occupant 24.

The vehicle seat 16 may be mounted to a vehicle frame in a vehicle.

The cushion 30 may be made from foam material. The cushion 30 may include an array 150 of outer heat-transfer nodes 50 located on an outer surface of the cushion 30. The cushion 30 may include an inner layer 31, a middle layer 32 and an outer layer 33, and the thermal device 22 may be embedded in the outer and middle layers 32, 33.

The heat-transfer station 11 may include a fan 60 coupled to the middle layer 32 to exhaust heat source 13 heat generated by the thermal device 22 when the thermal device 22 is in the occupant cooling mode.

The occupant-support base 10 may include a support pan 18 that is coupled to the seat pad 20, wherein the support pan 18 is arranged to underlie and support the seat pad 20.

The cushion cover 26 may block communication of air from the cushion-receiving space 28 to the occupant 24 resting on the occupant-support base.

The heat-transfer station 11 may include a heat mover 34, a heat source 13, and a heat sink 15.

The heat mover 34 may be coupled to the cushion 30 and positioned to lie in spaced-apart relation below an outer surface of the cushion 30.

The heat conductor 36 may be coupled to the heat mover 34 and extends between the heat mover 34 and an inner surface 40 of the cushion cover 26. The heat mover 34 moves thermal energy as a result of creating a temperature gradient.

Accordingly, heat may be transferred through the cushion cover 26 to the occupant 24 through a combination of conductive heat transfer and radiative heat transfer to provide a warming sensation 44 to occupant 24.

The heat source 13 may include one or more cavities 58 formed in the cushion 30 that contains heated fluid or gel, which is heated by a resistive heater. The fluid may be air or liquid.

The thermal electric device may include one or more thermal electric device microchips. The thermal device 22 may include an array of heat conductors 36 along with a corresponding array 150 of heat-transfer nodes 50 and a corresponding array 152 of heat pipes 52. The thermal device 22 may include a plurality of electrical wires woven through an array 156 of holes 56 formed in an outer layer of cushion 30.

As explained above, the array 150 of outer heat-transfer nodes 50 may be formed by the electrical wires of the thermal device 22, wherein the electrical wires contact the cushion cover 26 and associated heat pipes 52 are established where the wires extend through the holes 56 and couple to an array of associated thermal electric device microchips.

The thermal device 22 may include moisture-management means for managing moisture developed between the occupant 24 and the occupant-support base 10. In that further embodiment, the moisture-management means may include a source of pressurized, conditioned air directed between the occupant 24 and the occupant-support base 10.

The moisture-management means may be implemented in the cushion cover 26 and cushion 30, which may be made of a material configured to communicate moisture away from the occupant 24. Alternatively, or in addition, the moisture-management means may be implemented in the cushion cover 26 and cushion 30, which may be made from a material that absorbs moisture As explained above, a vehicle seat 16 may include a thermal device 22, a cushion 30, a cushion cover 26 that covers the cushion 30 and the thermal device 22, and a controller 42 coupled to the thermal device 22. The thermal device 22 may be coupled to the cushion 30, and wherein the thermal device 22 may be configured to, under the control of the controller, optionally provide a cold sensation 46 and a warming sensation 44 to an occupant 24 sitting in the vehicle seat 16 by moving heat between the thermal device 22 and an occupant 24 seated in the vehicle seat 16 without convective heat transfer.

An occupant-support base 10 for a vehicle seat 16 may comprise a cushion cover 26 defining a cushion-receiving space 28 therein, a cushion 30 positioned to lie in the cushion-receiving space 28, and a thermal device 22 coupled to the cushion 30 and arranged to lie in the cushion-receiving space 28. The thermal device 22 may be configured to provide means for moving heat between a heat-transfer station 11 located in the cushion 30 and an occupant seated on the occupant-support base 10 without convective heat transfer in one of a cooling mode in which heat moves from the occupant seated on the occupant-support base 10 through the cushion cover 26 to a heat sink 15 provided in the heat-transfer station 11 and a warming mode in which heat moves from a heat source 13 included in the heat-transfer station 11 through the cushion cover 26 to the seat occupant.

The cushion cover 26 may include an inner surface 40 arranged to face toward the cushion and an outer surface 40B arranged to face away from the cushion 30. The thermal device 22 includes the heat-transfer station 11 and a heat conductor 36 and a portion of the heat conductor 36 is positioned to lie between the inner surface 40 of the cushion cover 26 and an outer surface 38 of the cushion 30 to lie in confronting relation with the cushion cover 26.

The heat conductor 36 may be coupled to the heat-transfer station 11 to cause heat to flow between the occupant and the heat-transfer station 11 through the heat conductor 36.

The heat-transfer station 11 may include a heat mover 34 coupled to the cushion 30 and positioned to lie in spaced-apart relation below an outer surface 38 of the cushion 30, a heat source 13, and a heat sink 15.

The heat conductor 36 may be coupled to the heat mover 34 and extends between the heat mover 34 and the inner surface 40 of the cushion cover 26.

The occupant may provide the heat sink 15 when the heating sensation is provided to the occupant.

The heat mover 34 may move thermal energy as a result of creating a temperature gradient.

The occupant-support base 10 may provide a time to thermal sensation to the occupant sitting on the occupant-support base 10 in less than about 2 minutes after the occupant-support base 10 has been exposed to a hot temperature of about 50 degrees Fahrenheit for about two hours and the thermal device 22 is in the cooling mode.

The time to thermal sensation may be less than about 1 minute 40 seconds.

The occupant-support base 10 may provide a time to thermal sensation to the occupant sitting on the occupant-support base 10 in less than about 2 minutes after the occupant-support base 10 has been exposed to a cold temperature of about −10 degrees Fahrenheit for about two hours and the thermal device 22 is in a heating mode.

The time to thermal sensation may be less than about 1 minute.

The invention claimed is:

1. A vehicle seat including a seat pad included in the seat bottom or seat back, the vehicle seat comprising:
   an occupant-support base that is one or both of a seat bottom or a seat back, wherein the occupant-support base includes a thermal device and a seat pad,
   wherein the thermal device includes a heat-transfer station,
   wherein the seat pad includes a cushion, a cushion-receiving space formed in the cushion, and a cushion cover,
   wherein the cushion cover defines the cushion-receiving space and is arranged to extend around and cover the cushion,
   wherein the thermal device is coupled to the cushion and positioned to lie in the cushion-receiving space,
   wherein the thermal device is configured to optionally provide a cold sensation and a warming sensation to an occupant sitting in the vehicle seat by moving heat between the heat-transfer station coupled to the cushion located in the seat pad and the occupant seated in the vehicle seat without convective heat transfer, and
   wherein the thermal device also includes a heat conductor, a portion of which is positioned to lie between an inner surface of the cushion cover and an outer surface of the cushion and in confronting relation with the cushion cover and wherein the heat conductor is coupled to the heat-transfer station to cause heat to flow between the occupant and the heat-transfer station.

2. The vehicle seat of claim 1, further comprising a controller coupled to the thermal device to control whether the thermal device is in an occupant cooling mode or an occupant heating mode.

3. The vehicle seat of claim 2, wherein the vehicle seat includes the occupant-support base in the seat bottom and an occupant-support base in the seat back, wherein both the seat base and the seat back each include a thermal device and a seat pad, wherein the thermal device includes a heat-transfer station, and wherein each seat pad includes a cushion, a cushion-receiving space, and a cushion cover, wherein each cushion cover defines the cushion-receiving space and is arranged to extend around and cover the cushion, and wherein the thermal device in each occupant-support base is individually controlled by the controller to optionally provide a cold sensation and a warming sensation to the occupant sitting in the vehicle seat.

4. The vehicle seat of claim 2, wherein the controller is coupled to a control interface that enables independent selection of the occupant cooling mode or the occupant heating mode for each of the occupant-support base establishing the seat base and occupant-support base establishing the seat back.

5. The vehicle seat of claim 1, wherein the cushion includes an array of outer heat-transfer nodes located on an outer surface of the cushion.

6. The vehicle seat of claim 1, wherein the cushion cover blocks communication of air from the cushion-receiving space to the occupant resting on the occupant-support base.

7. The vehicle seat of claim 1, wherein the heat-transfer station includes a heat mover provided by the one or more thermal electric device microchips, a heat source, and a heat sink.

8. The vehicle seat of claim 7, wherein the heat mover is coupled to the cushion and positioned to lie in spaced-apart relation below an outer surface of the cushion.

9. The vehicle seat of claim 7, wherein the heat conductor is coupled to the heat mover and extends between the heat mover and an inner surface of the cushion cover.

10. The vehicle seat of claim 7, wherein the heat source includes one or more cavities formed in the cushion that contains one of heated fluid and heated gel and the one of heated fluid and heated gel is heated by a resistive heater.

11. The vehicle seat of claim 10, wherein the heated fluid is one of air and a liquid.

12. The vehicle seat of claim 1, wherein the thermal device includes moisture-management means for managing moisture developed between the occupant and the occupant-support base so that moisture between the occupant and the occupant-support base is minimized.

13. The vehicle seat of claim 12, wherein the moisture-management means includes a source of pressurized, conditioned air directed between the occupant and the occupant-support base.

14. An occupant-support base for a vehicle seat, the occupant-support base comprising
a cushion cover defining a cushion-receiving space therein,
a cushion positioned to lie in the cushion-receiving space, and
a thermal device coupled to the cushion and arranged to lie in the cushion-receiving space and configured to provide means for moving heat between a heat-transfer station located in the cushion and an occupant seated on the occupant-support base without convective heat transfer in one of a cooling mode in which heat moves from the occupant seated on the occupant-support base through the cushion cover to a heat sink provided in the heat-transfer station and a warming mode in which heat moves from a heat source included in the heat-transfer station through the cushion cover to the seat occupant,
wherein the cushion cover includes an inner surface arranged to face toward the cushion and an outer surface arranged to face away from the cushion and the thermal device includes the heat-transfer station and a heat conductor and a portion of the heat conductor is positioned to lie between the inner surface of the cushion cover and an outer surface of the cushion to lie in confronting relation with the cushion cover.

15. The occupant-support base of claim 14, wherein the heat mover is provided by one or more thermal electric device microchips.

16. The occupant-support base of claim 14, wherein the heat conductor is coupled to the heat-transfer station to cause heat to flow between the occupant and the heat-transfer station through the heat conductor.

17. The occupant-support base of claim 16, wherein the heat-transfer station includes a heat mover coupled to the cushion and positioned to lie in spaced-apart relation below an outer surface of the cushion, a heat source, and a heat sink.

18. The occupant-support base of claim 14, wherein the heat conductor is coupled to the heat mover and extends between the heat mover and the inner surface of the cushion cover.

19. The vehicle seat of claim 1, wherein the thermal device includes one or more thermal electric device microchips.

* * * * *